United States Patent
Takamoto

(10) Patent No.: US 8,366,949 B2
(45) Date of Patent: Feb. 5, 2013

(54) MOLD FOR MICROLENS AND PROCESS FOR PRODUCING THE SAME

(76) Inventor: Kiichi Takamoto, Takamatsu (JP)

(*) Notice: Subject to any disclaimer, the term of this patent is extended or adjusted under 35 U.S.C. 154(b) by 927 days.

(21) Appl. No.: 12/063,140

(22) PCT Filed: Aug. 17, 2006

(86) PCT No.: PCT/JP2006/316152
§ 371 (c)(1),
(2), (4) Date: Mar. 3, 2009

(87) PCT Pub. No.: WO2007/020967
PCT Pub. Date: Feb. 22, 2007

(65) Prior Publication Data
US 2009/0194666 A1    Aug. 6, 2009

(30) Foreign Application Priority Data
Aug. 19, 2005  (JP) .................. 2005-238596

(51) Int. Cl.
*B23D 11/00* (2006.01)

(52) U.S. Cl. ............... 216/24; 216/26; 216/66; 216/79
(58) Field of Classification Search .......... 216/24, 216/26, 66, 79
See application file for complete search history.

(56) References Cited

U.S. PATENT DOCUMENTS

| 2002/0145807 A1* | 10/2002 | Nishikawa | 359/619 |
| 2005/0128595 A1* | 6/2005 | Shimizu | 359/619 |
| 2005/0239228 A1* | 10/2005 | Quenzer et al. | 438/29 |

FOREIGN PATENT DOCUMENTS

JP    2005111839 A * 4/2005

* cited by examiner

*Primary Examiner* — Binh X Tran
(74) *Attorney, Agent, or Firm* — Weaver Austin Villeneuve & Sampson LLP

(57) ABSTRACT

A mold for producing microlenses or a microlens array is produced by sequentially carrying out an etching step of forming quadrangular pyramid concave parts on a single crystal silicon substrate by anisotropic etching and an ion etching step of forming molding concave parts with spherical or cylindrical surface parts from the quadrangular pyramid concave parts.

5 Claims, 20 Drawing Sheets

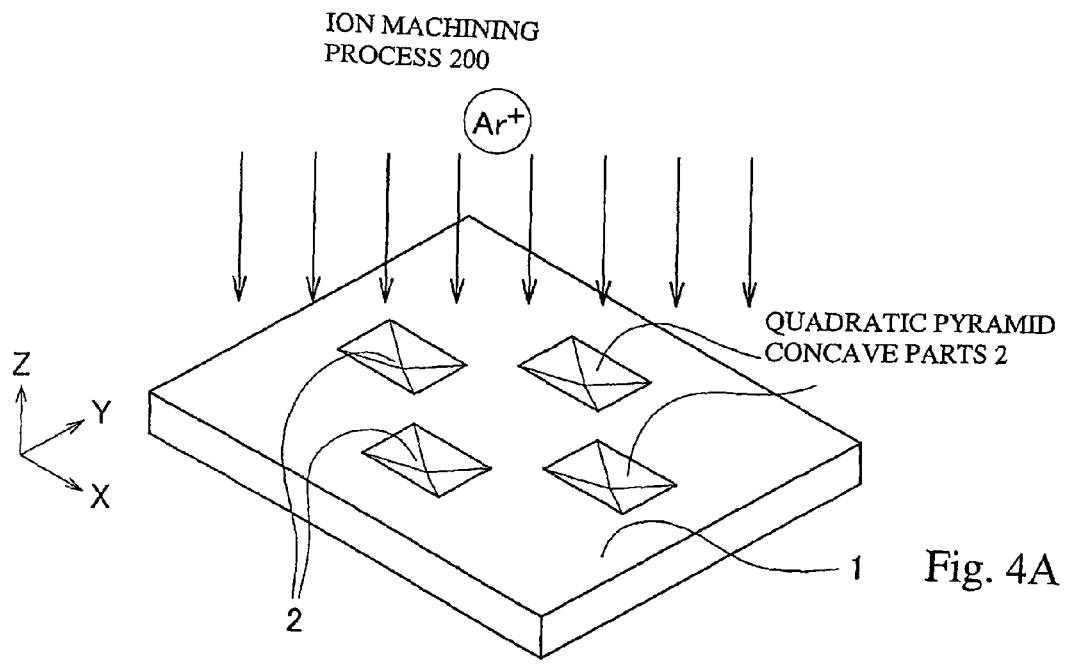
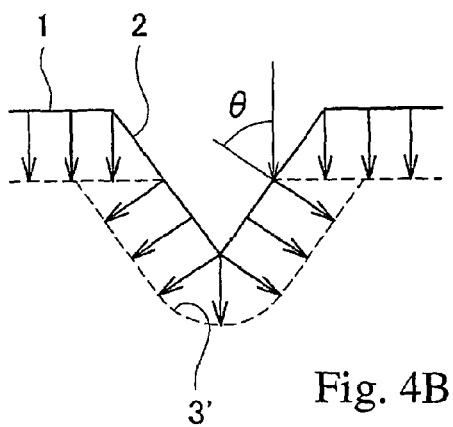
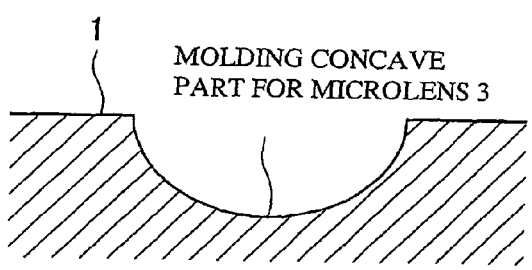
Fig. 4A
Fig. 4B
Fig. 4C

INITIAL SHAPE

AFTER 10 HOURS ional Appli-
MOLD FOR MICROLENS AND PROCESS FOR PRODUCING THE SAME This application is a continuation of International Application No. PCT/JP2006/316152, filed Aug. 17, 2006 which claims priority on Japanese Patent Application 2005-238596 filed Aug. 19, 2005.

BACKGROUND OF THE INVENTION

This invention relates to a mold for microlens, a process for its production and microlens. Small lenses with diameters less than a few millimeters are referred to as microlenses. Several of them may be formed in a neatly arranged array or they may be used singly, as disclosed in Optoelectronics Technical Dictionary (edited by Shunichi Tanaka, et al. and published by Ohm Publishing Co. (1996)). This invention relates to a mold that may be used for the production of such a microlens, a process for its production and microlens.

Throughout herein, the term "microlens" may be used to indicate both a single microlens and a microlens array, especially they are not particularly distinguished.

Lenses for cameras and optical microscopes are produced by polishing an optical material or by obtaining a mold for a molding process. These production methods for ordinary lenses cannot be used for the production of microlenses with a small size. For this reason, different methods as explained below are used for the production of microlenses. Since microlenses are divided into the refraction type and the diffraction type, these types are separately explained.

Microlenses of the diffraction type are produced principally by using a production technology for semiconductor integrated circuits. In other words, technologies such as photolithography and electron beam lithography are used for the production, but the required accuracy in superposition is severe with photolithography, and electron beam lithography is disadvantageous in that patterning in a special shape such as a circle is required and that the productivity is low. Microlenses of the diffraction type are also disadvantageous in that chromatic aberration is large and that the efficiency of light convergence is low.

The ion exchange method and the reflow method are representative production methods for microlenses of the refraction type. When a microlens array of the refraction type is produced by the ion exchange method, a metallic film with openings at the positions of microlenses is formed on a glass substrate and this is immersed in molten salt in this condition. If thallium sulfate is used as the molten salt, the glass substrate is immersed in it for over 100 hours. Not only is this production method time-consuming, but it is also difficult to obtain an ideal distribution of refraction index by this method. In particular, this method is disadvantageous in that the aberration becomes large at the circumference of the microlenses.

The reflow method includes the following four steps, as described in FIG. 23A (See "Applied Optics", Vol. 27, No. 7, pages 1281-1284 (1988)): (a) the step of forming a thin aluminum film over a quartz substrate and providing the aluminum film with openings of diameter 15 μm; (b) the step of forming circular pedestals of diameter 30 μm over these openings, these pedestals being processed so as to be insoluble in the solvent and stable at temperatures over 180° C.; (c) the step of forming circular columns with diameter 25 μm and height 12 μm with photoresist on these circular pedestals; and (d) the step of heating for 15 minutes at 140° C. to produce an array of spherically shaped microlenses. The transformation into the spherical shapes by this reflow method is based on the principle of surface energy being minimized by surface tension.

Accurate measurements cannot be obtained by this reflow method, however, because the surface tension is easily affected by external disturbances. Thus, fluctuations are likely to result in the optical characteristics of the lenses. When a lens array is produced, furthermore, the spheres must be prevented from mutually contacting such that the surface tension will not deform them. Thus, flat portions (or non-lens portions) are formed between mutually adjacent spheres, as shown in FIG. 23B. When the product is used as a lens array, the portion of the light that passes through such flat portions becomes the stray light, causing an increase in noise, reducing the efficiency in the passage of light and generating cross talks. Since it is difficult to eliminate such flat portions, the ratio {(the array area)−(the flat area within the array area)}/(the surface area) is referred to as the "fill factor" and is considered one of the indicators for the evaluation of the characteristics of a microlens array.

As explained above, microlenses of the refraction type produced by conventional methods can at best be called nearly spherical. Although they can converge light and improve the efficiency of light transmittance, the convergence of light is not like that by a lens of the normal size. In other words, there is currently no microlens of the refraction type having high optical characteristics.

SUMMARY OF THE INVENTION

It is therefore an object of this invention in view of the current situation described above to provide a mold capable of producing microlenses of the refraction type with high optical characteristics and a method of producing such molds as designed, as well as microlenses and their production methods.

A first aspect of this invention relates to a method of producing a mold for microlens, characterized as sequentially carrying out an etching step of forming quadrangular pyramid concave parts on a single crystal silicon substrate by anisotropic etching and an ion etching step of forming a molding concave part from the quadrangular pyramid concave part by ion etching.

According to a second aspect of the invention, the etching step comprises carrying out chemical anisotropic etching on a single crystal silicon substrate with a surface which is a {100} crystal surface.

According to a third aspect of the invention, the ion etching step comprises carrying out an etching process on the silicon substrate by using an inactive gas as ionization gas and exposing the silicon substrate to accelerated ions.

According to a fourth aspect of the invention, the quadrangular pyramid concave part is a square pyramid concave part and the molding concave part forms a spherical microlens.

According to a fifth aspect of the invention, the quadrangular pyramid concave part is a rectangular pyramid concave part and the molding concave part forms a cylindrical microlens.

A sixth aspect of the invention relates to a mold for microlens, characterized as comprising a silicon substrate having formed thereon a plurality of molding concave parts for microlens in an aligned formation so as to be mutually contacting without having any non-lens portions left in between, these molding concave parts being formed initially by forming quadrangular concave parts on a single crystal silicon substrate by anisotropic etching and next by forming these quadrangular concave parts in spherical or cylindrical surface forms by ion etching.

A seventh aspect of the invention relates to a microlens characterized as being produced by using a mold according to the sixth aspect of the invention.

By the method according to the first aspect of this invention, quadrangular pyramid concave parts are first formed on the surface of a silicon substrate by anisotropic etching and each surface of these quadrangular pyramid concave parts is evolved next by ion etching to form curved surfaces such that molding concave parts for producing microlens are formed. This method has the following merits.

(A) Since the molding concave parts for microlens are highly spherical, it is possible to obtain molds capable of producing microlenses of refraction type having nearly perfectly spherical surfaces.

(B) The shape and measurements of the molding concave parts can be freely controlled because quadrangular pyramid concave parts can be formed by crystal anisotropic etching accurately in the initial shape according to the design and the substrate surface can be etched accurately by ion etching for evolving spherical surfaces.

(C) Flat portions that are unwanted for the production of molds can be eliminated because the radius of curvature of the spherical surfaces that eventually become the molds keeps increasing with the etch depth and hence the ion etching can be continued until the peripheries of adjacent spherical concave parts come to contact each other.

(D) Molds for producing microlenses of various sizes including very small to relatively large can be obtained because the initial shape can be formed accurately by crystal anisotropic etching and the etch depth can be accurately controlled by ion etching.

(E) Molds capable of producing a microlens array with a large area can be obtained by using a silicon substrate with a large area because there is no limitation on the measure of the equipment for etching and ion etching for the silicon substrate.

(F) Molds capable of producing microlenses at a reduced cost can be obtained because a silicon substrate is used and there are only two production processes (etching and ion etching) involved.

By the method according to the second aspect of this invention, a single crystal silicon substrate with a {100} crystal surface is used. Since the etch rate is the slowest in the direction normal to the {111} crystal surface, crystal surfaces serving as an etch stop can be preliminarily identified, and quadrangular concave parts formed only with {111} surfaces can be obtained. Thus, a quadrangular concave part having a desired shape can be obtained by anisotropic etching by forming an appropriate mask on the silicon substrate. When square and rectangular concave parts are thus formed on a {100} silicon substrate by anisotropic etching, measurements can be obtained in a wide range and concave parts without fluctuations in measurements and shape can be formed and each concave part can be positioned highly accurately. Moreover, highly accurately spherical molding concave parts can be formed in a later process.

By the method according to the third aspect of this invention, ions irradiate in the form of a shower and the silicon surface material is etched mainly by a physical process. The rate of this ion etching varies according to the angle of ion incidence onto the substrate surface. Molding concave parts for microlens can be produced accurately because the rate of ion etching in the normal direction on the surface of ion incidence becomes constant in a coordinate system that moves at a constant speed with changing the surface of the ion incidence within the range of the angle of incidence θ from zero (normal incidence onto the sample surface) to a certain maximum angle $\theta_{max}$. Since the etch rate is proportional to etch time, the etch depth of the ion etching can be accurately controlled on the basis of the etching time. Thus, both molds for single microlenses and those for a microlens array can be produced freely.

By the method according to the fourth aspect of this invention, a spherical concave part with a circular shape can be formed from a square pyramid concave part and a mold for a spherical lens can be produced.

By the method according to the fifth aspect of this invention, a cylindrical concave part can be formed from a rectangular pyramid concave part and a mold for a cylindrical lens can be produced.

A mold according to the sixth aspect of this invention inherits the merits of the first aspect and the mold obtained according thereto has the following merits.

(a) Since the molding concave part for microlens is accurately spherical, microlenses of the refraction type with nearly perfectly spherical surfaces can be produced.

(b) Microlenses and microlens arrays with various shapes can be produced because various shapes of molding concave parts for microlens are possible.

(c) Microlens arrays with no flat portions that cause back light can be produced by using a mold with no unnecessary flat portions.

(d) Since molding concave parts of various sizes from very small to relatively large can be formed, microlenses and microlens arrays of various sizes can be produced.

(e) Microlens arrays with a large area can be produced by using a mold using a silicon substrate with a large area.

(f) The material cost is low because a silicon substrate is used for the mold and microlenses and microlens arrays can be produced at a low cost although the lifetime may not be long.

A microlens according to the seventh aspect of the invention has highly accurately formed spherical or cylindrical surfaces and does not generate stray light and hence has optical characteristics that are as good as those for ordinary lenses whether it is used as a single microlens or as a microlens array.

BRIEF DESCRIPTION OF THE DRAWINGS

FIGS. 4A, 4B and 4C, together referred to as FIG. 4, are drawings for explaining the ion etching step 200.

DETAILED DESCRIPTION OF THE INVENTION

Embodiments of the invention are described next with reference to the drawings.

Figure 1:
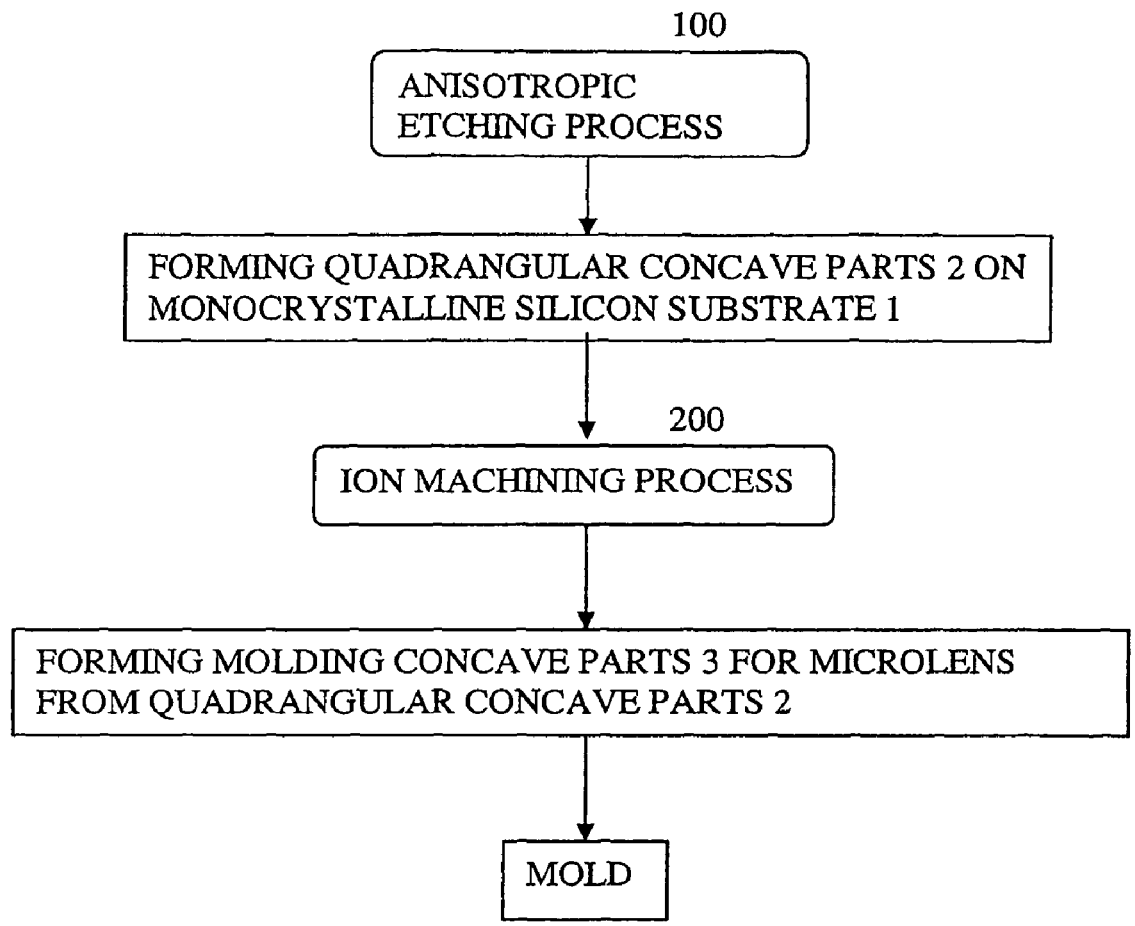
FIG. 1 is an approximate process diagram that shows the production method of a mold for microlens according to this invention.

Basic principles of the production method of a mold for microlens according to this invention are explained first with reference to FIG. 1.

Firstly, a concave part hereinafter referred to as the quadrangular pyramid concave part 2 is formed on a single crystal silicon substrate 1 having a 100 crystal surface in an anisotropic etching process {100} using a chemical etching method. (See FIG. 2.) What is herein referred to as the quadrangular pyramid concave part 2, however, may be an indentation not only of a square shape but also of a rectangular shape in the plan view. In the case of an indentation with a square shape in the plan view, it is a normal pyramid shape with the top at one point. In the case of an indentation with a rectangular shape in the plan view, it is an indentation of a so-called wedge shape with the top having a finite length. The surfaces forming such indentations are all {111} crystal surfaces.

Figure 3:
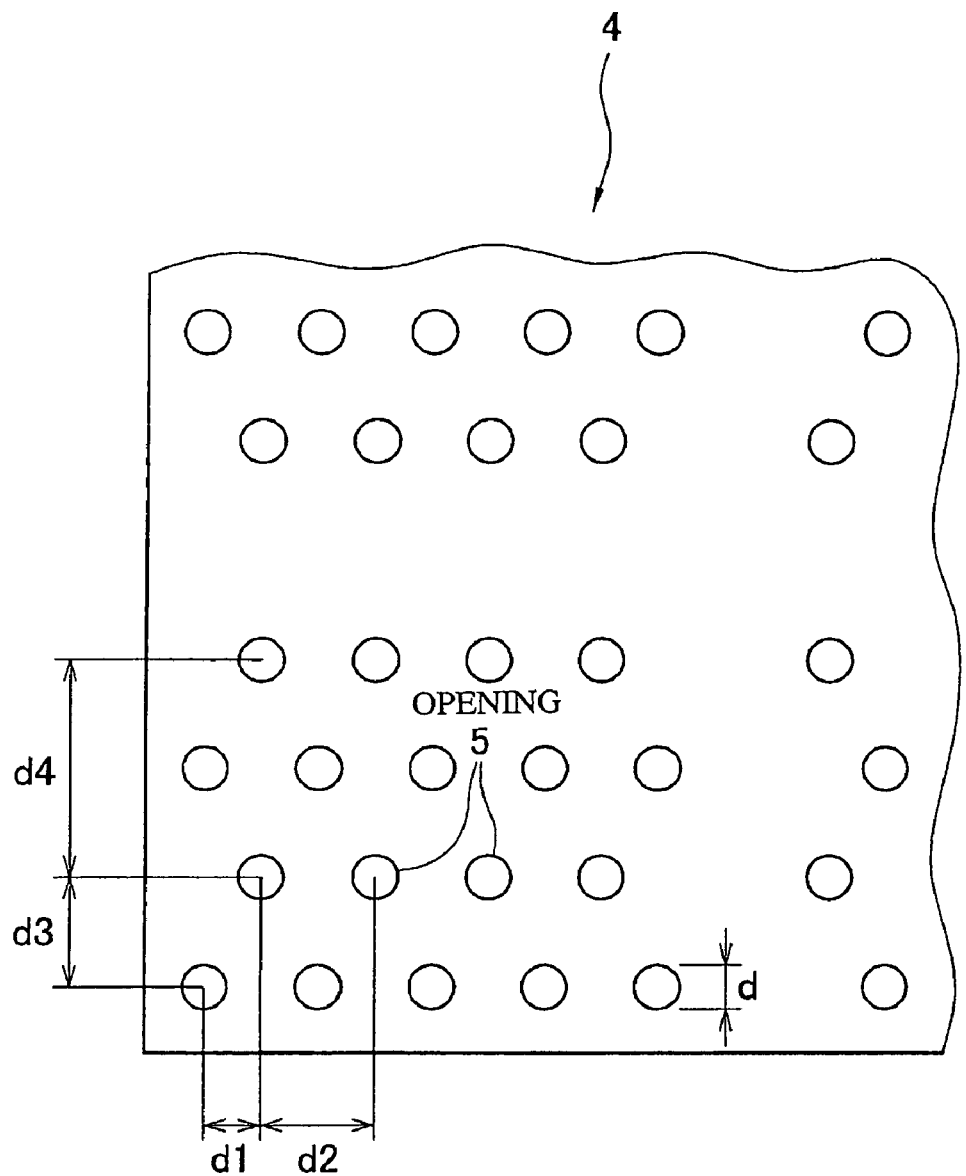
FIG. 3 shows a mask pattern on a photo mask used in the etching process.

In this anisotropic etching process, it is essentially to use the chemical anisotropic method. When an accurate (preliminarily determined) measurement or shape is formed on a substrate by chemical etching on the single crystal silicon substrate 1, etch stops play an important role. In the case of anisotropic etching making use of the phenomenon that the etch rate is slower in the direction normal to the {111} crystal surface than in any other direction, it is possible to preliminarily determine the crystal surface that is to function as the etch stop, and a shape formed only by {111} surfaces can be obtained. For this reason, it is possible to obtain a predetermined measurement or shape by carrying out anisotropic etching with an appropriate mask formed on the silicon substrate 1. Consider an example where a mask having a circular opening 5 as shown in FIG. 3 is used. If the diameter of the opening 5 is d, the length of each side of the quadrangle in the plan view of the quadrangular pyramid concave part 2 formed on the {100} silicon substrate 1 becomes d and if the depth of the indentation is h, there is the relationship h=0.707d.

The top of the quadrangular pyramid concave part 2 is at the center of the circular opening 5. When a mask pattern for anisotropic etching is formed, the ultraviolet beam exposure method, the x-ray exposure method and the electron beam exposure method may be used, and openings with diameters d of 0.1 μm or less can be obtained. If openings with larger diameters are desired, there is no limit to the diameter d. The accuracy in measurement and position of the pattern obtainable by these exposure methods is normally 0.1 μm or less. Anisotropic etching is also used for forming throughholes through silicon substrates of thickness 500 μm or more. By ordinary chemical etching, the depth of etching is normally 1 μm or less.

When square or rectangular pyramid concave parts 2 are thus formed on the {100} silicon substrate 1 by anisotropic etching, their measurements can be selected from a wide range and the concave parts 2 can be formed without fluctuations in measurements and shapes and they can be positioned with a high degree of accuracy. This advantage does not depend on the size of the silicon substrate 1, and this serves as a precondition for the later process of forming molding concave parts 3 for microlenses with a high level of sphericity.

The invention is most preferably applicable to silicon substrates 1 with {100} crystal surface because they are easily obtainable and inexpensive but it goes without saying that the invention is applicable also to other kinds of wafers. Consider, for example, a quadrangular pyramid concave part 2 formed with {111} crystal surfaces. If a silicon substrate 1 with a crystal surface crossing this quadrangular pyramid concave part 2 as its surface is used, it is possible to form a quadrangular pyramid concave part 2 on the substrate surface. In this case, however, the central axis of the quadrangular pyramid concave part 2 becomes oblique with respect to the surface while the central axis of the quadrangular pyramid concave part 2 formed on the silicon substrate 1 with a {100} crystal surface as its surface becomes perpendicular to the surface. When an ion etching is carried out on such a quadrangular pyramid concave part 2 and when the etch depth of this process is sufficient, however, a molding concave part 3 for microlens evolves from the top of the quadrangular pyramid concave part 2.

In the subsequent ion etching step 200, the ion etching process is carried out wherein ions irradiate the sample surface in the form of a shower and the sample surface is removed mainly by a physical process. As a surface portion of the silicon substrate 1 on which microlenses are to be formed is exposed to ions and removed, a curved surface begins to be formed from the neighborhood of the tip of the quadrangular pyramid concave part 2, the tip of the square pyramid concave part 2 changing into a spherically shaped concave part and the rectangular pyramid concave part 2 changing into a combination of a cylindrical concave part with semispherical parts at both ends. In what follows, both spherically shaped concave parts and cylindrically shaped concave parts are referred to as a molding concave part 3 for microlens.

Figure 5A:
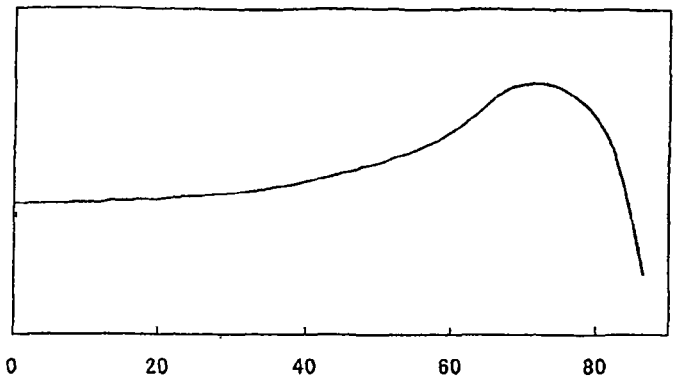
FIG. 5A is a graph of the relationship between the sputtering yield Y and the angle of incidence θ.
Figure 5B:
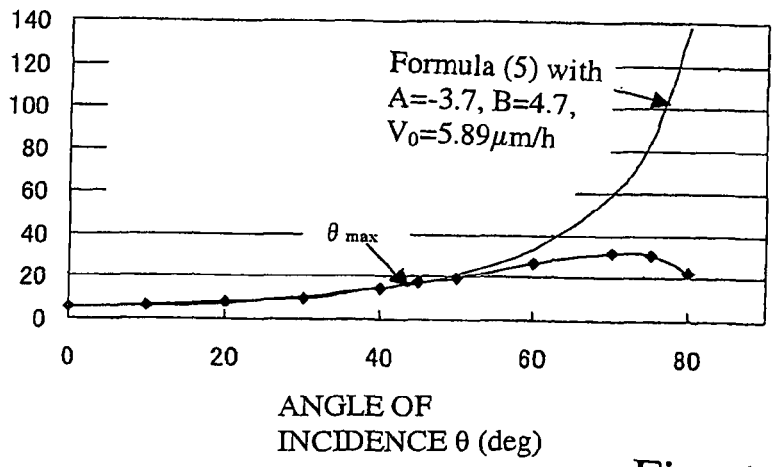
FIG. 5B is a graph of the relationship between the angle of incidence θ and the etch rate compared with Formula (5)
Figure 5C:
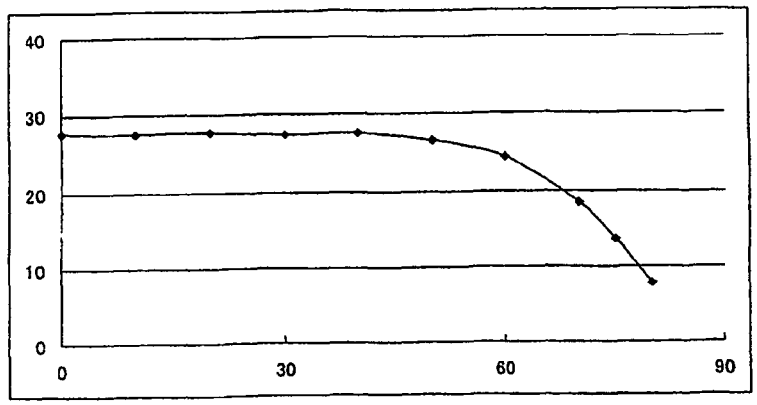
FIG. 5C is a graph of the relationship between the etch rate in the normal direction $V_{gn}$ of z=g(x, y, t) and the incident angle of ions (in degrees).

In the process step described above, the rate of ion etching varies according to the angle of ion incidence onto the sample surface. If the etch rate in the direction normal to the surface of the ion incidence is obtained in the coordinate system which moves at a fixed speed as the surface of ion incidence changes, an etched surface may be considered to be formed at a constant etch rate especially within a range from where the angle of ion incidence is zero (normal incidence onto the sample surface) to a certain angle $\theta_{max}$, as shown in FIG. 5C. As a result, spherical and cylindrical molding concave parts 3 for microlenses with high degrees of accuracy in measurements and shapes can be formed, as shown in FIG. 4C. If the ion etching is further continued after square and rectangular concave parts 2 have all been etched into spherical and cylindrical concave parts, the radii of the spherical and cylindrical concave parts continue to increase, depending on the etch depth.

The production process described above is explained next more in detail.

Figure 2:
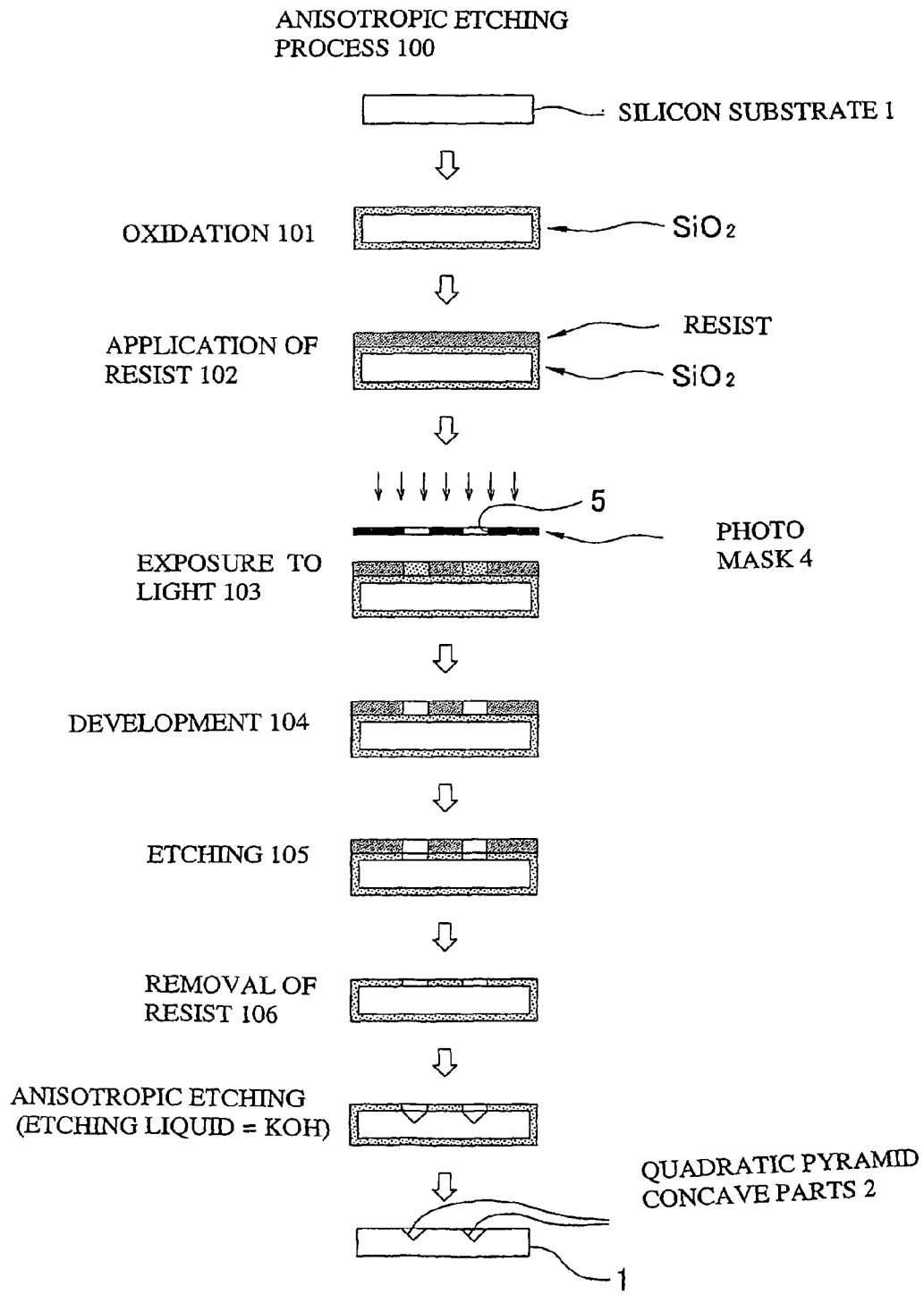
FIG. 2 is a process diagram of the etching process 100.

The principal steps of the anisotropic etching process 100 are shown in FIG. 2, according to which a {100} silicon substrate 1 is used to form quadrangular pyramid concave parts 2 by anisotropic etching in a chemical etching process.

The anisotropic etching process is carried out as a conventional method in the order of formation of $SiO_2$ film (101), application of resist (102), exposure to light (103), development of the resist film (104), etching of the oxide film (105), removal of the resist (106) and anisotropic etching (107). The silicon oxide film is highly resistive against KOH solution which is the chemical etching system for the anisotropic etching used in this invention and is commonly used as a mask material. The silicon oxide film is used as a mask from its formation (101) to the process of the removal of the resist (106) for forming holes through the silicon oxide film only where anisotropic etching is carried out. The silicon substrate 1 that is obtained by the steps leading to the removal of the resist (106) is placed inside an etchant with anisotropic property for carrying out anisotropic etching (107).

FIG. 3 shows an example of pattern on a photo mask 4 used in the aforementioned exposure process (103). Holes corresponding to the openings 5 are formed through the silicon oxide film. If the diameter of the hole formed through the silicon oxide film is d, it is known that the length of each side of the square seen in the plan view of the square pyramid concave part 2 formed in the {100} silicon substrate 1 becomes d. The depth h of the concave part in this situation becomes h=0.707d, as explained above. FIG. 3 shows an example wherein the openings 5 are arranged such that their centers are at the corners of equilateral triangles and all openings 5 have the same diameter. If a production process of this invention is thus continued until the processed quantity reaches a certain level, molding concave parts 3 for microlenses arranged in a honeycomb shape without leaving any non-lens portions can be produced. If the measurements of the openings 5 and the positions of the openings 5 are set appropriately, molds for microlens and microlens arrays having desired measurements and desired arrangement can be produced.

The aforementioned anisotropic etching process (107) is the so-called crystalline anisotropic etching, making use of the fact that the silicon substrate 1 is single crystal and that its etch rate varies significantly in the case of a specified chemical etching system, depending on the crystalline direction. It is a technology for obtaining a structure by etching the silicon substrate 1 itself.

The crystalline anisotropic etching of this invention makes use of the fact that the etch rate in the direction normal to the {111} crystal surface is extremely slow compared to the etch rates in other directions. The {111} crystal surface serves as an etch stop such that all concave parts resulting from the anisotropic etching process are formed with the {111} surfaces. For forming quadrangular pyramid concave parts 2, a so-called {100} silicon substrate 1 produced with surfaces normal to the {100} direction is used. A thin film that is highly resistive to etching is formed on the surface of this silicon substrate, and openings 5 with a specified measurement are formed at specified positions on this thin film by using a technology for lithography such as the ultraviolet exposure method, the X-ray exposure method and the electron beam exposure method and the etching technology for this thin film. Next, a process of immersing the silicon substrate 1 with the openings 5 formed thereon in an etching liquid manifesting crystal anisotropy is carried out. Known examples of such anisotropic etchant include aqueous KOH solution (potassium hydroxide), aqueous EDP solution (mixture of ethylene diamine, pyrocatecol and water) and aqueous TMHA (tetramethylammonium hydroxide) solution. As a result, quadrangular pyramid concave parts 2 are formed by the anisotropic etchant with crystal surfaces in the direction normal to which the etch rate is the slowest.

If the openings 5 of the mask for the anisotropic etching are all circular, the positions of the corners of the square pyramid concave parts 2 match those of the centers of the circular openings 5 and the length of the sides of the square pyramids becomes equal to the diameter of the circular openings 5. Thus, it is not particularly necessary to accurately match the direction of arrangement of the openings 5 with the crystalline direction of the silicon substrate 1. If both square and rectangular openings are included in the mask for anisotropic etching, on the other hand, the directions of these squares and rectangles must be matched with the {100} direction of the surface of the silicon substrate 1 (normally the direction of the facet). If these directions do not match, the planar measurements of the square and rectangular pyramid concave parts 2 become larger than the openings 5 of the mark, depending on the magnitude of the misalignment. Since the technology for aligning the direction of a mask pattern and the crystalline direction of a silicon substrate 1 is sufficiently well developed, any ordinary alignment technology may be used to avoid any problem.

As explained above, since the {111} crystal surface functions effectively as etch stop if crystal anisotropic etching is carried out for forming the initial shape, quadrangular pyramid concave parts 2 with accurate shapes and measurements can be formed all over the silicon substrate 1. Since deeper etching is possible than by isotropic chemical etching, larger quadrangular pyramid concave parts can be formed. This is a main feature of this invention and makes it possible to attain a high degree of accuracy in the shape of curved surfaces, measurements and arrangements required in the production of microlenses and microlens arrays.

The ion etching step 200 is an etching process for obtaining molding concave parts 3 for microlens (spherical and cylindrical concave parts) 3 from the quadrangular pyramid concave parts 2 that were earlier formed. This process is carried out, as shown in FIG. 4A, by exposing the silicon substrate 1 with many quadrangular pyramid concave parts 2 initially formed thereon to a shower of ions such as argon ions that are accelerated and moving on nearly parallel lines.

When exposed to the ions, the flat portions of the surface of the silicon substrate 1 become etched while remaining flat such that curved surface portions become expanded from the convexes of the quadrangular pyramid concave parts 2 and from the portions of the cross lines between the surfaces forming the quadrangular pyramid concave parts convex in the direction of the depth of the substrate. Since the rate of ion etching is the same on the substrate surface where the incident angle of the ions is zero, the etching process by the exposure to the ions progresses while the depth of the initial shape of the quadrangular pyramid concave parts 2 is maintained. As the spherical and cylindrical concave parts being formed from the convexes of the quadrangular pyramid concave parts 2 expand, the flat portions of the quadrangular pyramid concave parts 2 disappear and in due time the quadrangular pyramid concave parts 2 are evolved into spherical and cylindrical concave parts.

The condition for the applicability of the method described above to the present invention is to project ions moving on nearly parallel lines in a shower and to make use of ion etching based on the functions of the ions for physically etching materials.

In this ion etching step, an inactive gas which does not cause any chemical reaction with the target of etching is used as the ionization gas, and ions are projected onto the substrate surface to carry out the etching process. This is a physical process making use of one of the effects of ion bombardment.

The ions that are projected with kinetic energy of several tens or more of electron volts give away their kinetic energy to the atoms on the substrate surface by colliding with them. If the surface atoms thereby gains enough energy for cutting off the bond with the substrate atoms, they can be ejected from the substrate surface. The number of atoms that are ejected from the surface by one projected ion is called the sputtering yield. The sputtering yield changes, depending upon the angle of incidence $\theta$ of the ions. The sputtering yield $Y(\theta)$ of many materials changes as shown in FIG. 5A. As the angle of incidence $\theta$ is increased from zero, kinetic energy of an incident ions is imparted not only to the surface atom with which it collides directly but also to the surrounding atoms such that $Y(\theta)$ begins to increase. If $\theta=90°$, the ion is moving parallel to the substrate surface, and its kinetic energy is hardly transferred to the surface atom. Thus, $Y(\theta)=0$ at $\theta=90°$. In other words, the efficiency in transferring kinetic energy of ion to the surface atom diminishes if $\theta$ is too large, and there is a value of $\theta$ at which $Y(\theta)$ is a maximum. $Y(\theta)$ changes, depending on the material, the kind of the ion and the kinetic energy of the ion. If the rate of ion etching is written as $V(\theta)$ and $Y(\theta)$ and $V(\theta)$ are both normalized to 1 at $\theta=0°$, $Y(\theta)$ and $V(\theta)$ match on the same curve. The present invention makes use of the dependence of $V(\theta)$ on the angle of incidence $\theta$ to form the spherical and cylindrical concave parts from the initial shape.

The aforementioned ion etching step requires a device with the function of accelerating an ionized inactive gas (such as He, Ne, Ar, Kr and Xe) and irradiating a sample surface therewith, capable of carrying out a physical removal process. There are three types of such systems, as described below. For the purpose of the present invention, it should be remarked that it would be sufficient if silicon can be removed by a principally physical mechanism and hence ions of gases such as $N_2$, $CO_2$ and air may be used because their physical removal efficiency becomes greater than their chemical removal efficiency if the accelerating voltage is sufficiently high.

(1) Ion Beam (Ion Shower and Ion Milling) Systems

These devices have a gas inlet and are provided with the functions of ionizing the gas introduced therethrough and accelerating the ions by applying a voltage. An ion source for generating a nearly parallel ion beam (or ion shower) and a sample holder and a chamber where the ion beam is projected to the sample and a vacuum system for maintaining the ion source and the reaction chamber in a vacuum are equipped.

(2) Etching Systems with Parallel Plates

Parallel plates for applying a high-frequency or direct current voltage and a sample holding mechanism set near one of the electrode surfaces of these parallel plates are placed inside the same vacuum chamber. A gas introduced into this vacuum chamber is ionized by applying a high-frequency or direct current voltage to the parallel plates. As the gas is ionized, a potential difference known as self-bias is generated near the electrode with the sample holding mechanism, and the ions are accelerated by this potential difference to irradiate the sample surface. Systems using high-frequency discharge (such as RF sputtering systems, where RF (radio frequency) is 13.56 MHz) and direct current systems (such as DC sputtering systems) are included.

(3) Microwave Plasma Etching Systems

A gas is ionized by microwaves of 2.45 GHz generated by a magnetron. A high frequency wave is applied to a sample holder to control the accelerating voltage of the ions irradiating the sample.

In the ion etching process for ionizing an inactive gas to carry out a material removal process by using the accelerated ions, the etch rate V of the sample bombarded by ion changes, depending on the angle of incidence $\theta$ of the ions onto the sample surface. In other words, V is a function of $\theta$ and is expressed as $V(\theta)$. The etch rate $V(\theta)$ is measured from a reference surface on the sample surface in the direction of motion of the ions. The zero angle of incidence means normal incidence of ions onto the sample surface. Thus, if the sample is provided with an uneven initial surface condition, the initial shape changes, depending on $V(\theta)$, as the ion etching progresses. Spherical and cylindrical concave parts are generated by using this phenomenon.

If $V(\theta)$ is expressed as $V(\theta)=(A+B/\cos\theta)V_0$ where A, B and $V_0$ are constants and $A+B=1$, and a quadrangular pyramid concave part 2 is initially prepared on the sample surface, this quadrangular pyramid concave part 2 changes into a cavity with a perfectly spherical or cylindrical surfaces as the ion etching progresses. It can be shown from an experimental result (as shown in FIG. 5B) that the formula given applies within a range of $0 \leq \theta \leq \theta_{max}$ where $\theta_{max}$ is obtainable from this experimental result.

At the deepest place in the initial shape, there is a point at which $\theta$ is considered to be equal to zero. Since the sample is usually set to the ion etching system such that the sample surface (the reference surface) has $\theta=0$, the rate of ion etching becomes equal between the point at the deepest place where $\theta=0$ and on the sample surface. Since the ion etching progresses while the depth of the initial shape is maintained and the initial shape becomes wider in the direction of the sample surface, the thickness of the microlenses cannot be increased beyond the depth of the initial shape. After a spherical or cylindrical concave part is formed at the deepest place of the initial shape, it swells like a balloon thereafter as the ion etching progresses.

As a test example, a (100) silicon wafer ((100)Si) with a mirror-polished (100) surface is used as the sample, and square pyramid concave parts 2 having a base with sides of 40 μm were formed by crystal anisotropic etching as the initial shape. An ion beam system provided with a Kaufman-type ion source was used for ion etching. Argon was the ionization gas and accelerated under the conditions of accelerating voltage=2 kV, ion current density=13 mA/cm$^2$ and the pressure inside the ion exposure chamber=$5\times10^{-3}$ Pa.

A Si wafer of an appropriate size was used to mask a portion of the (100)Si wafer to expose to the ions to form exposed parts and unexposed parts on the (100)Si wafer surface. The sample was taken out of the ion bombardment chamber every two hours of bombardment to the ions and the step difference was measured between the exposed and unexposed parts by an instrument for measuring surface roughness to obtain the etch depth. At the same time, the ways in which the initial shape change with time were obtained by measuring the cross-sectional profile by using the instrument for measuring surface roughness and by observing the shape by means of an optical microscope. A stylus with radius of curvature 5 μm was used for the instrument for measuring surface roughness.

Figure 6A:
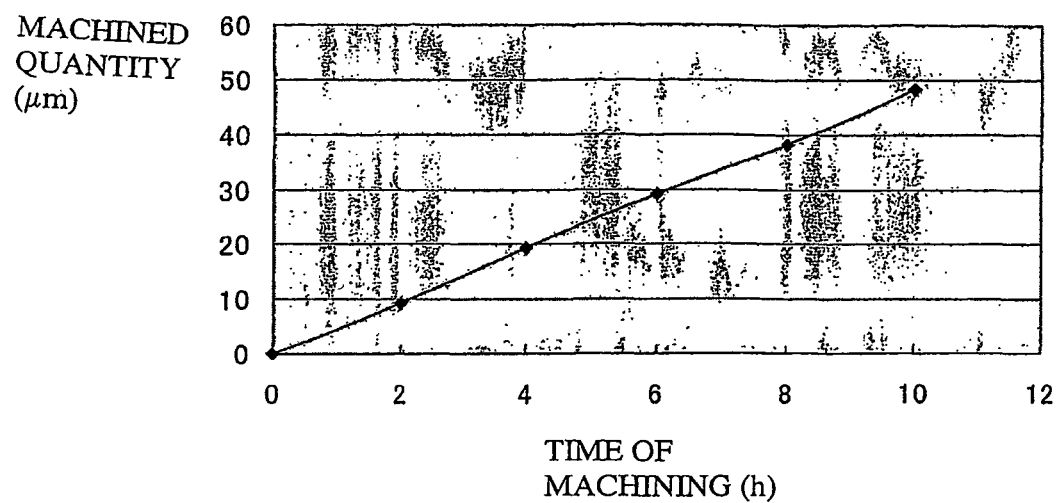
FIG. 6A is a graph of the relationship between the etch rate and the etching time.

Characteristics of the ion machining are explained next with reference to FIGS. 6A and 6B. FIG. 6A shows the relationship between the etch depth and the etching time. The etch depth is increasing proportionally to the etching time, the etch rate being 5 μm/h. As will be explained below, the radius of curvature of the spherical and cylindrical concave parts that are formed can be controlled by the etch depth. It is generally considered to be difficult, however, to accurately measure the etch depth during the ion etching process, although the etching time can be easily measured. The proportionality relationship between the etch depth and the etching time shown in FIG. 6A indicates that the etch depth can be accurately controlled by the etching time.

Figure 6B:
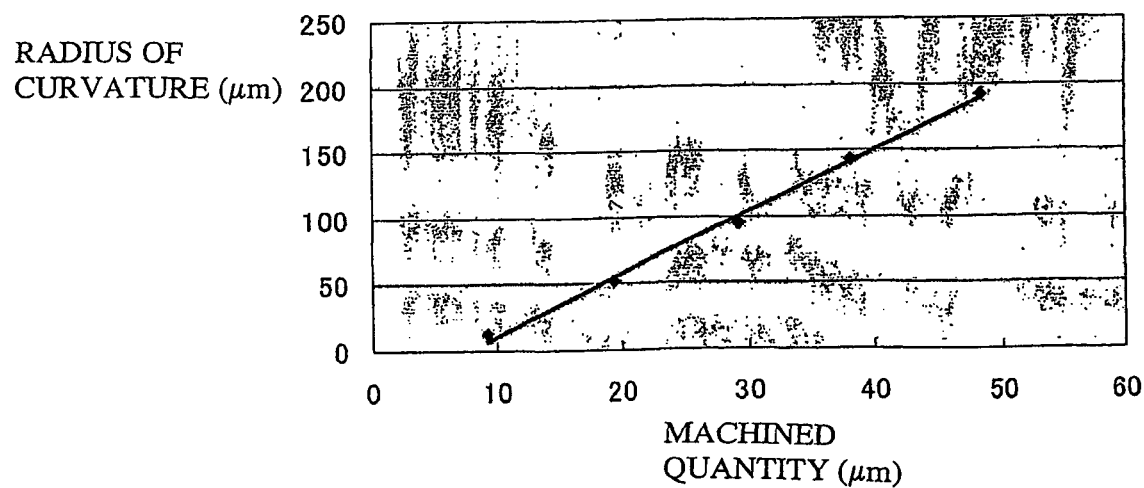
FIG. 6B is a graph of the relationship between the etch depth and the radius of curvature.

FIG. 6B shows the relationship between the etch depth and the radius of curvature related to the change from an initial shape. The radius of curvature was obtained at a spherical surface portion because spherical concave parts are formed from the bottom parts of square pyramid concave parts 2. Once a spherical concave part is formed, its radius of curvature increases proportionally to the etch depth, as shown in FIG. 6B. This indicates that the radius of curvature can be accurately controlled by the etch depth.

FIG. 7, comprising FIGS. 7A, 7B, 7C, 7D and 7E, show the change with the etching time in the shape of a molding concave part 3 for microlens. In each of FIGS. 7A, 7B, 7C, 7D and 7E, the curve that is fitted to the cross-sectional profile measured by an instrument for measuring surface roughness represents a circle. Explained more in detail, the radius of curvature of a circle is determined such that it will best match the molding concave part 3 for microlens which is beginning to be formed from the bottom part of the initial shape, and the curve described by this circle is shown superposed onto the profile obtained by the instrument for measuring surface roughness.

Figure 7A:
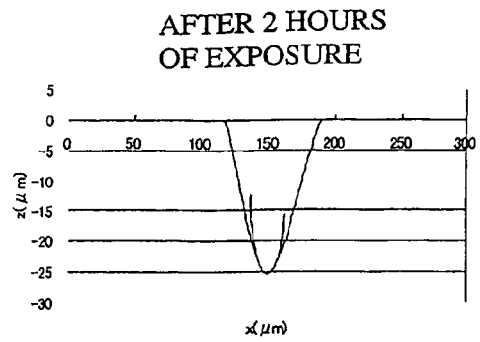
FIGS. 7A, 7B, 7C, 7D and 7E, together referred to as FIG. 7, show the change in an evolved shape with the ion etching time.
Figure 7B:
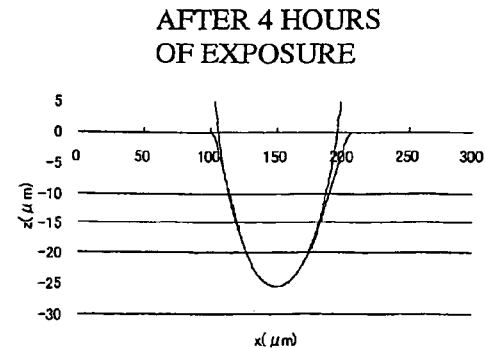
Figure 7C:
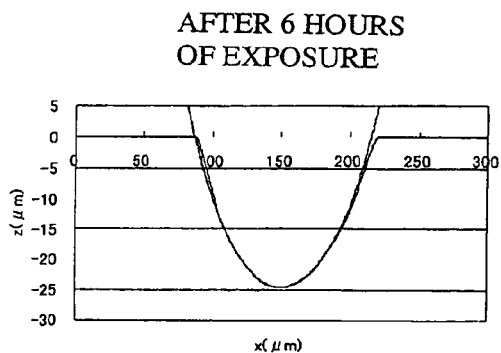
Figure 7D:
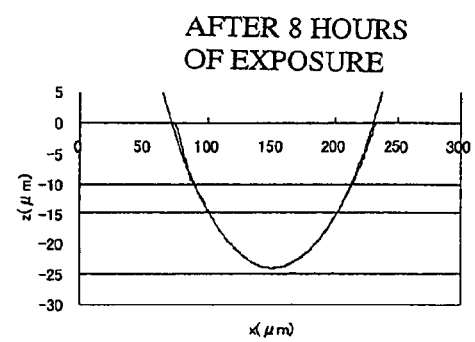
Figure 7E:
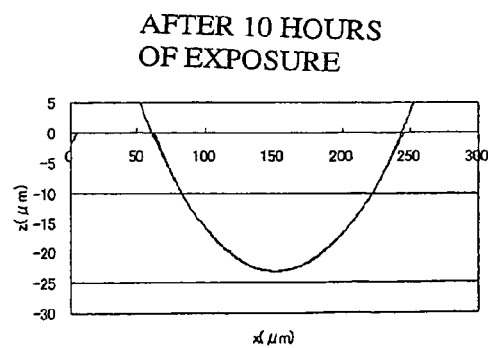

FIGS. 7A, 7B, 7C and 7D show situations where the flat portions of the quadrangular pyramid concave part 2 have not yet completely evolved into a spherical shape. It can be seen in each of them that the curve of the circle is deviated from the profile by the instrument for measuring surface roughness near the surface of the silicon substrate 1. FIG. 7E shows a situation where the flat portions of the quadrangular pyramid concave part 2 have completely disappeared and the initial shape has transformed into a molding concave part 3 for microlens such that the curve of the circle completely coincides with the profile by the instrument for measuring surface roughness.

Figure 8A:
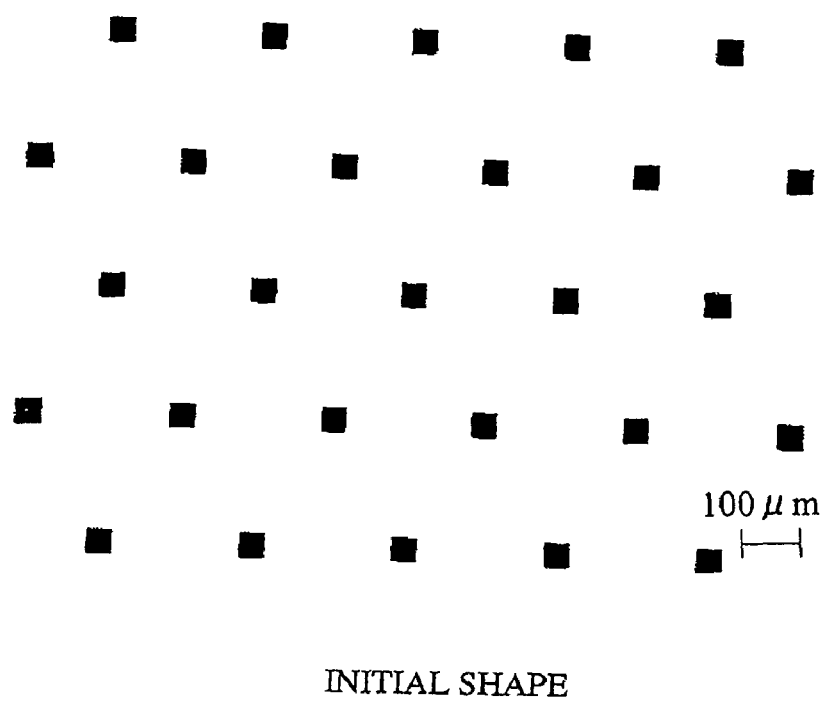
FIG. 8A is a plan view of the initial shape of square pyramid concave parts 2 formed on the silicon substrate 1.
Figure 8B:
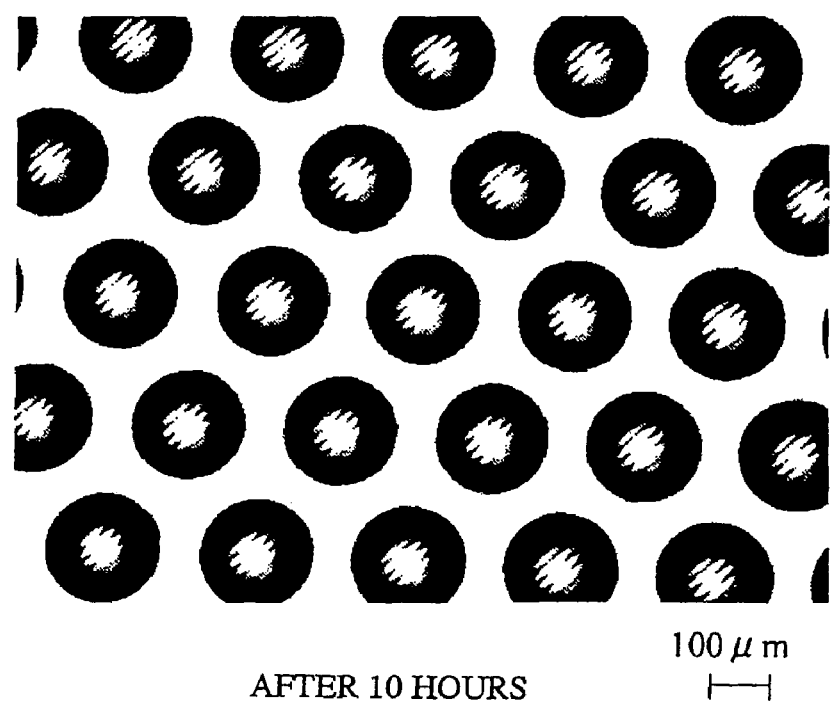
FIG. 8B is a plan view of the molding concave parts 3 for microlens obtained after 10 hours of exposure to ions.

FIGS. 8A and 8B respectively show the initial shape of quadrangular pyramid concave parts 2 formed on the silicon substrate 1 before the ion etching process and in the situation of FIG. 7E after 10 hours of ion etching. FIG. 8A shows the square shapes of the square pyramid concave parts 2 arranged such that their centers are at the corners of equilateral triangles of the same size. FIG. 8B shows the condition in which a molding concave part 3 for microlens has developed from each of the square pyramid concave parts 2 of FIG. 8A. In this plan view, it can be ascertained that the squares of FIG. 8A have been transformed into circles, the diameter of each molding concave part 3 for microlens on the substrate surface being 185 μm. Interference fringes are seen at the center of each circle, surrounded by a black portion. This black portion comes about because the numerical aperture (NA) of the objective of the optical microscope is small and the reflected light from the area where the slope of the molding concave part 3 for microlens is large is not taken in.

In the case of a situation such as after 10 hours of ion etching, as shown in FIG. 8B, the surface of the silicon substrate 1 still has flat portions remaining between mutually adjacent molding concave parts 3 for microlens. A mold may be produced at this stage by terminating the ion etching. If such flat portions are to be left on the substrate surface, and if in particular the distances between the microlenses are to remain large, it is effective for producing many microlenses at the same by later separating them into individual or pluralities of microlenses.

Figure 13A:
FIG. 13 includes FIG. 13A which is a plan view and FIG. 13B which is a sectional profile of the silicon substrate of FIG. 9 after 19 hours of ion machining.
Figure 13B:
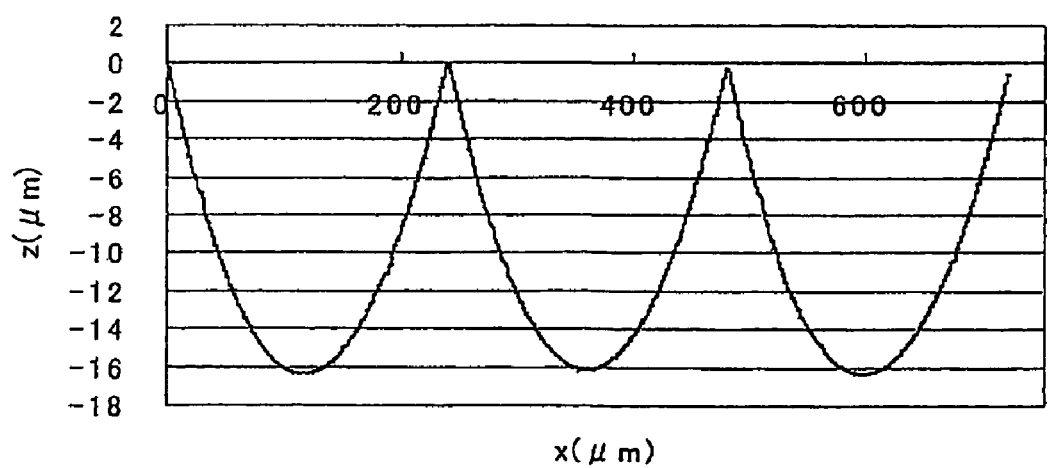

When the ion etching is carried out further, say, for 19 hours, all neighboring pairs of molding concave parts 3 for microlens come to contact each other, as shown in FIG. 13, there being no flat parts left on the substrate surface and the entire surface becoming newly formed by ion etching. As can be seen from the cross-sectional profile measured by an instrument for roughness, the connecting points of the curves indicating pairs of mutually adjacent molding concave parts 3 for microlens are singular points, and each curve is connected while maintaining its own shape. Thus, an area having only spherical and cylindrical concave parts and having no flat part at all can be formed on the silicon substrate 1. This is suited for producing microlens arrays preferably not having any flat parts (non-lens parts) at all.

Figure 9A:
FIG. 9 is for explaining the initial shape of a silicon base material with a quadrangular pyramid concave part formed immediately before the ion etching, including FIG. 9A which is a plan view showing one quadrangular pyramid concave part and FIG. 9B which is its sectional profile.
Figure 9B:
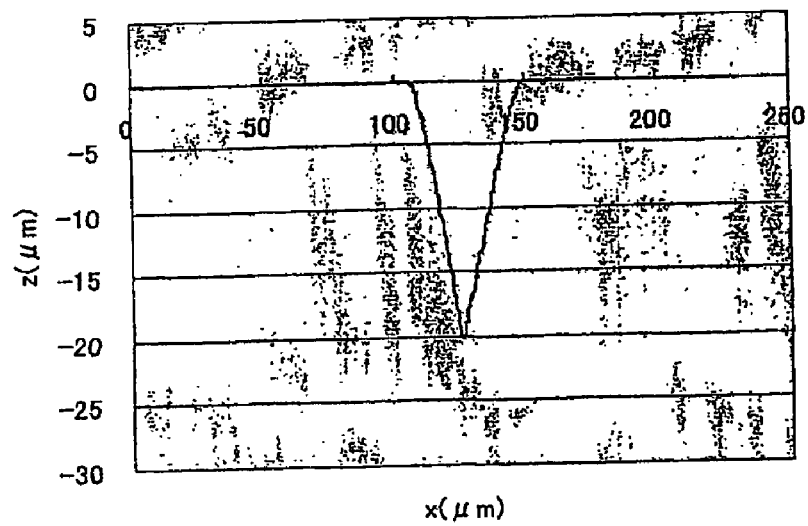

FIGS. 9-12 are explained next. FIG. 9 shows a plan view of the initial shape of a square pyramid concave part and its cross-sectional profile by means of an instrument for measuring surface roughness. The bottom surface of the square pyramid concave part has sides of lengths 40 μm and the depth of its tip is 28 μm. Near the deepest position, however, the sectional shape cannot be measured accurately because the tip of the probe needle cannot reach due to its finite radius of curvature and its own size.

Figure 10A:
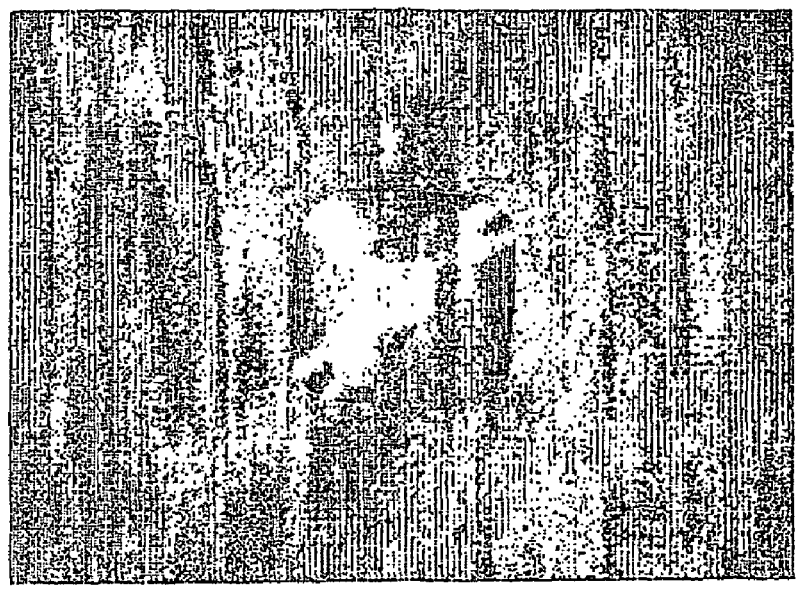
FIG. 10 includes FIG. 10A which is a plan view and FIG. 10B which is a sectional profile of the silicon substrate of FIG. 9 after 2 hours of ion machining.
Figure 10B:
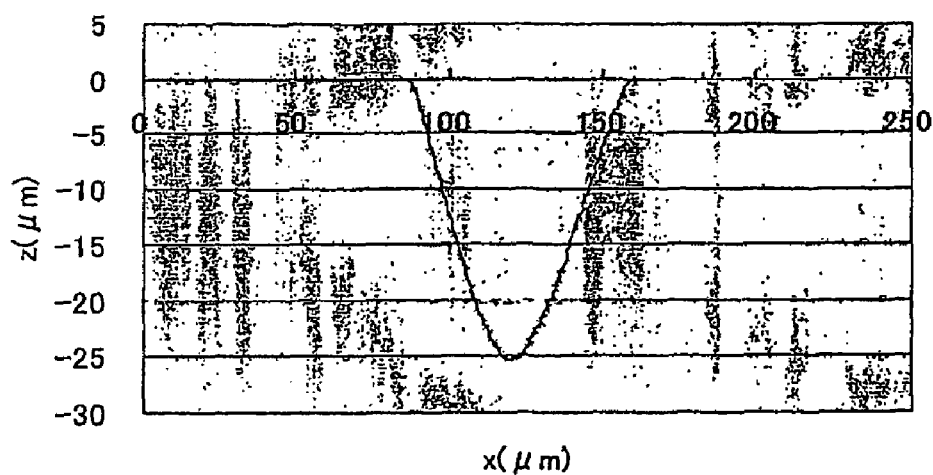

FIG. 10 shows the situation after two hours of ion etching. The plan view shows that there are still flat portions left but it can be seen that cylindrical concave parts are being formed from ridge lines of the side surfaces of the square pyramid concave parts.

Figure 11A:
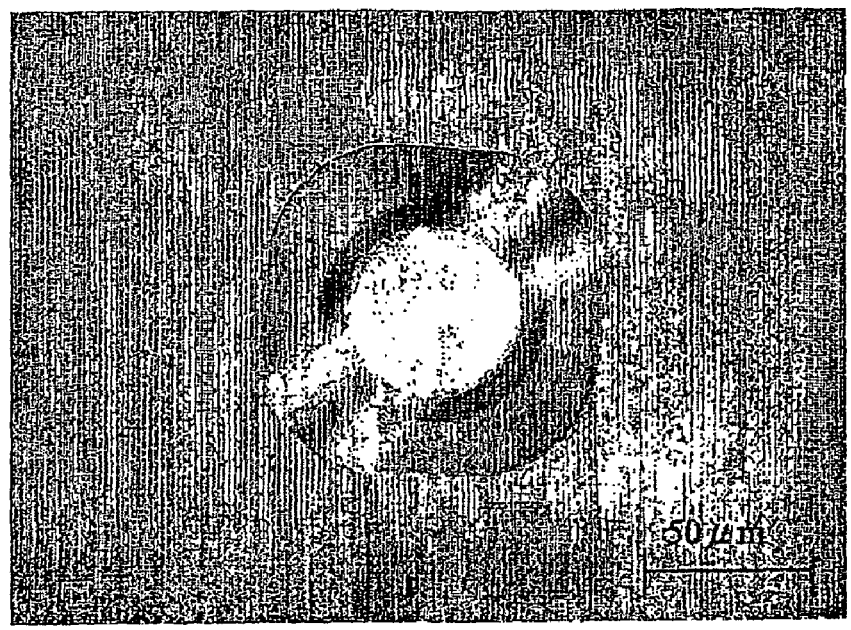
FIG. 11 includes FIG. 11A which is a plan view and FIG. 11B which is a sectional profile of the silicon substrate of FIG. 9 after 4 hours of ion machining.
Figure 11B:
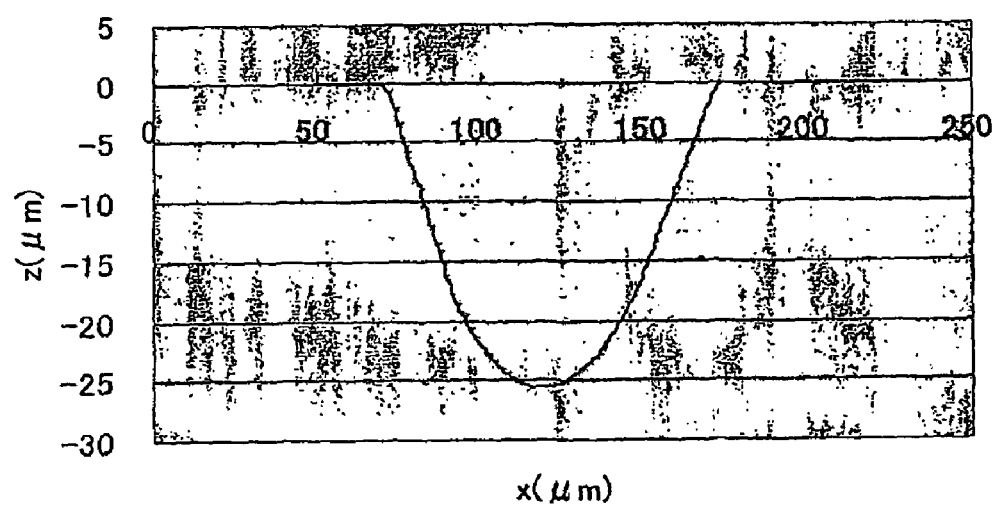

FIG. 11 shows the situation after four hours of ion etching. Its plan view shows that the spherical and cylindrical concave parts of FIG. 10 have further developed and that the flat portions on the side surfaces of the square pyramid concave parts 2 are becoming smaller. The regions of the spherical concave parts are increasing.

Figure 12A:
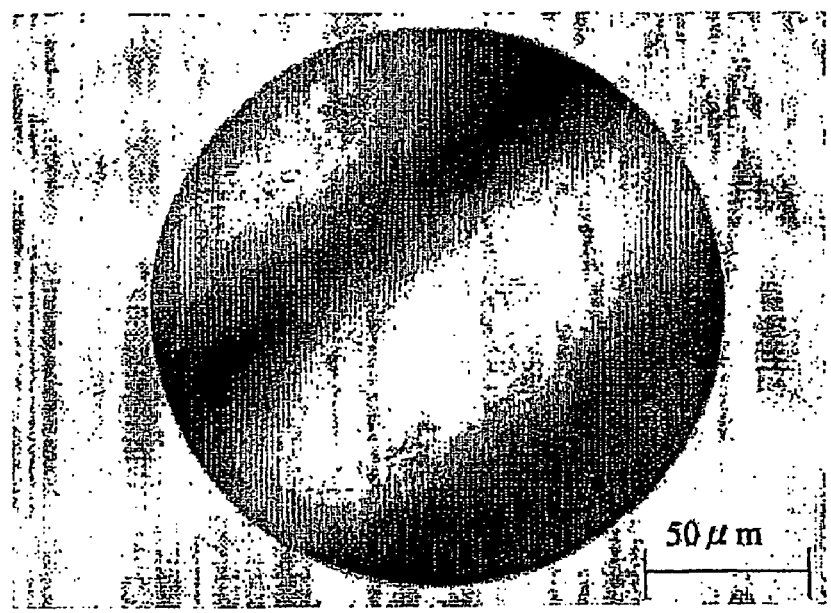
FIG. 12 includes FIG. 12A which is a plan view and FIG. 12B which is a sectional profile of the silicon substrate of FIG. 9 after 10 hours of ion machining.
Figure 12B:
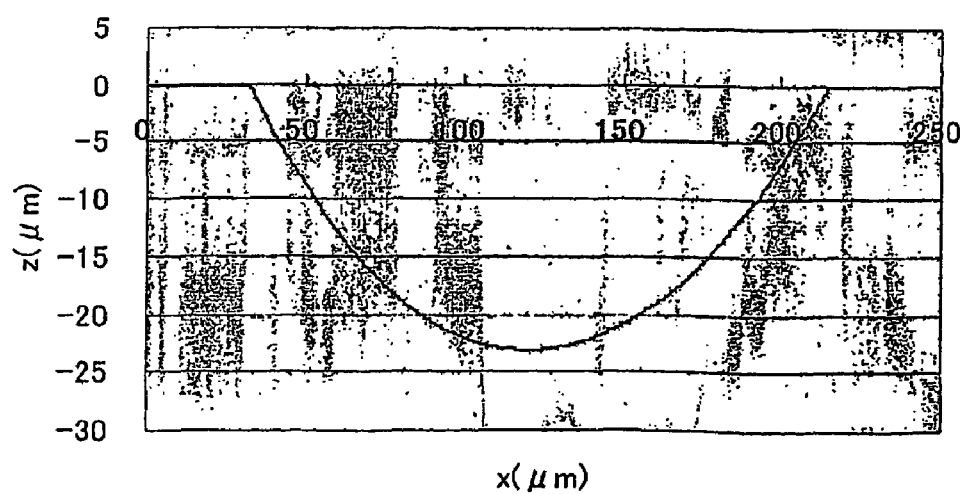

As the ion etching is further progressed, the flat portions of the square pyramid concave parts 2 have disappeared and spherical concave parts have been formed by the time 10 hours have passed, as shown in FIG. 12. Since the stylus of the instrument for measuring roughness is not provided with the function of accurately locating its path of tracing, some of the profiles shown in FIGS. 10-12 may not have been measured through the center of the plan view.

According to this invention, molds for microlens shaped as explained below can be produced. The planar shape and measurements of each of microlenses comprising a microlens array are determined by the initial arrangement and depth of the quadrangular pyramid concave parts 2.

Figure 14A:
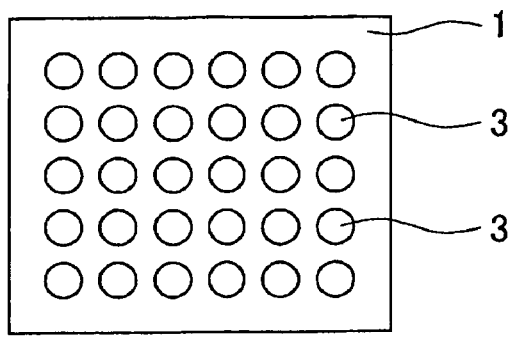
FIG. 14A is a plan view of a mold according to a first example.

FIG. 14A shows an example (first example) wherein circular molding concave parts 3 for microlens are formed on the silicon substrate 1 by leaving flat portions between these molding concave parts 3 for microlens which are mutually separated. Each of these molding concave parts 3 individually becomes a mold for producing a microlens.

Figure 14B:
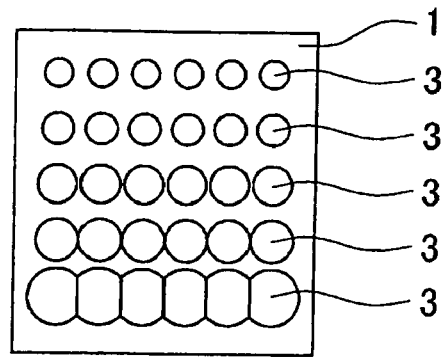
FIG. 14B is a plan view of a mold according to a second example.

FIG. 14B shows a second example wherein molding concave parts 3 for microlens are formed in several lines such that those on the upper lines are mutually separated but their diameters become larger as one moves to the lower lines and those on the lowest line are mutually in contact. The diameter of a molding concave part for microlens can be made larger by making the initial shape of the quadrangular pyramid concave part deeper. In this example, the initial shape is selected such that the quadrangular pyramid concave parts on the lower lines are deeper.

Figure 15A:
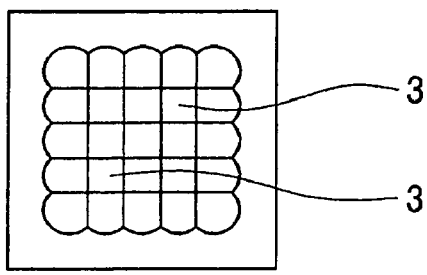
FIG. 15A is a plan view of a mold according to a third example.

FIG. 15A shows a third example having a plurality of molding concave parts 3 for microlens arranged horizontally and vertically, each being a square. Square-shaped molding concave parts 3 for microlens can be formed by starting out with square pyramid concave parts 2 such that their vertexes are at the corners of virtual square areas.

Figure 15B:
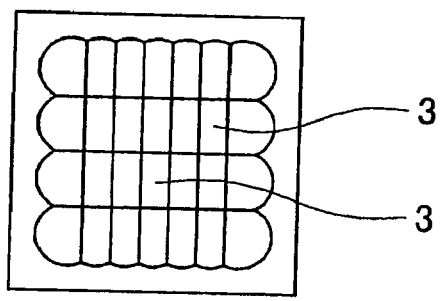
FIG. 15B is a plan view of a mold according to a fourth example.

FIG. 15B shows a fourth example also having a plurality of molding concave parts 3 for microlens arranged horizontally and vertically, each being rectangular. Rectangularly shaped molding concave parts 3 for microlens can be formed by starting out with square pyramid concave parts 2 such that their vertexes are at the corners of virtual rectangular areas.

Figure 15C:
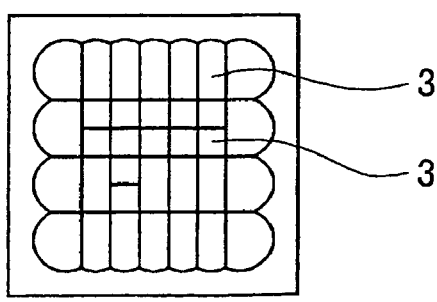
FIG. 15C is a plan view of a mold according to a fifth example.

FIG. 15C shows a fifth example having both square and rectangular molding concave parts 3 for microlens mixed together. Such a mixed arrangement can be realized by initially forming square and rectangular pyramid concave parts 2 in a combined manner.

Figure 16A:
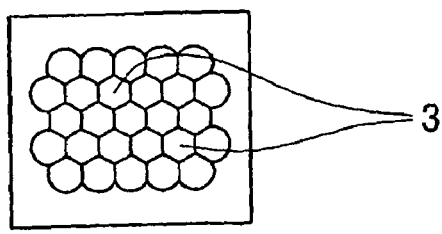
FIG. 16A is a plan view of a mold according to a sixth example.

FIG. 16A shows a sixth example with regular hexagonal molding concave parts 3 for microlens. Such regular hexagonal molding concave parts 3 for microlens can be formed by starting out with quadrangular pyramid concave parts 2 such that their vertexes are at the corners of virtual equilateral triangles.

Figure 16B:
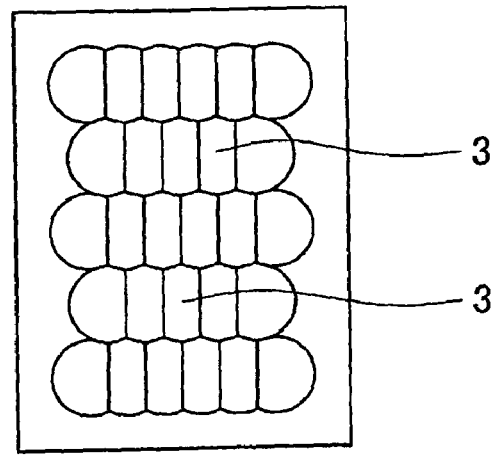
FIG. 16B is a plan view of a mold according to a seventh example.

FIG. 16B shows a seventh example with elongated hexagonal molding concave parts 3 for microlens. Such elongated hexagonal molding concave parts 3 for microlens can be formed by starting out with quadrangular pyramid concave parts 2 such that their vertexes are at the corners of virtual diamond-shaped areas.

Figure 17:
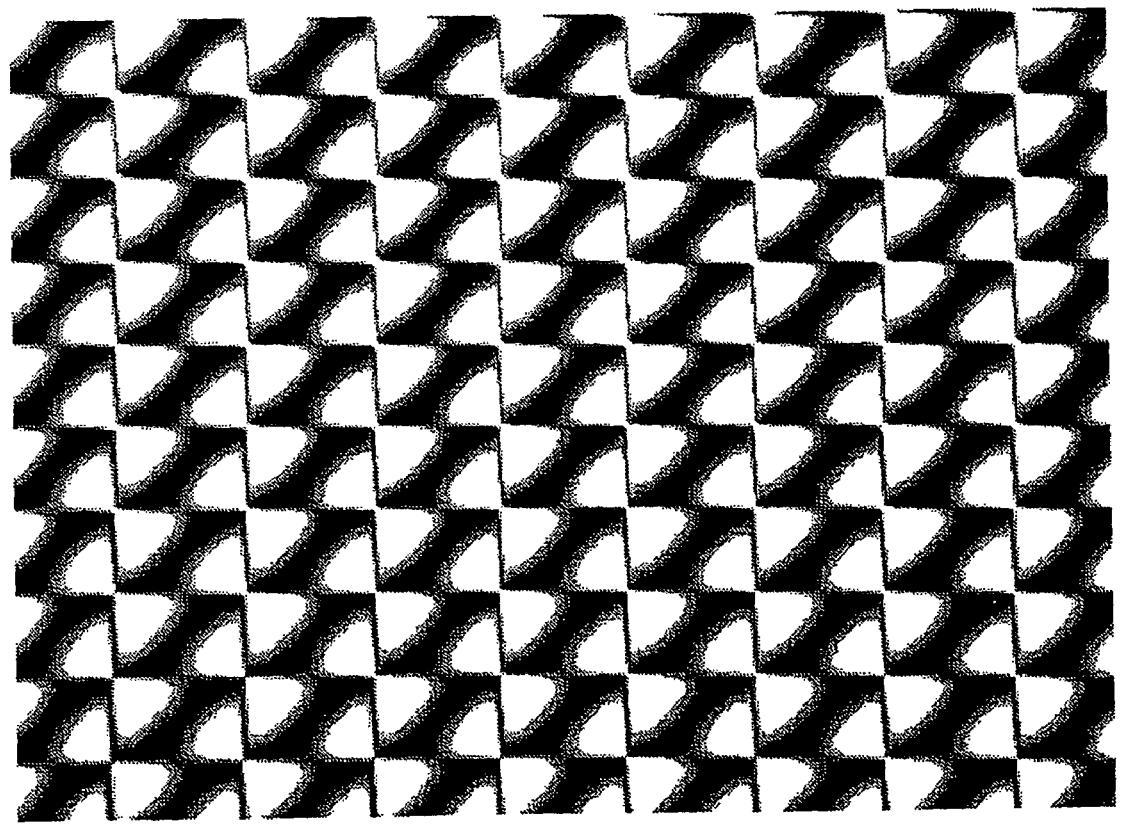
FIG. 17 is a photograph of an example of microlens array.

FIG. 17 is a photograph of an example of microlens array obtained by forming rectangular molding concave parts 3 horizontally and vertically and eliminating the flat portions (non-lens portions). The longer and short sides of each microlens are 15 μm and 10 μm, respectively.

Merits of the production methods of this invention include the following.

Firstly, since the molding concave parts 3 for microlens are highly spherical, it is possible to obtain molds capable of producing microlenses of refraction type having nearly perfectly spherical surfaces.

Secondly, the shape and measurements of the molding concave parts 3 can be freely controlled because quadrangular pyramid concave parts 2 can be formed accurately by crystal anisotropic etching in the initial shape according to the design and portions of the substrate surface can be etched accurately by ion etching for evolving spherical surfaces.

Thirdly, flat portions (non-lens portions) that are unwanted for the production of molds can be eliminated because the radius of curvature of the spherical surfaces that eventually become the molds keeps increasing with the etch depth and hence the ion etching can be continued until the peripheries of adjacent spherical concave parts come to mutually contact.

Fourthly, molds for producing microlenses of various sizes including very small to relatively large can be obtained because the initial shape can be formed accurately by crystal anisotropic etching and the etch depth can be accurately controlled by ion etching.

Fifthly, molds capable of producing a microlens array with a large area can be obtained by using a silicon substrate with a large area because there is no limitation on the measure of the equipment for etching and ion etching for the silicon substrate.

Sixthly, molds capable of producing microlenses at a reduced cost can be obtained because a silicon substrate is used and there are only two production processes (etching and ion etching) involved.

Theoretical grounds for the ion etching process of this invention are explained next. Firstly, the theoretical ground for the formation of spherical and cylindrical surfaces by the physical process of ion etching is explained by considering a situation where a substrate is exposed to ions of an inactive gas for carrying out a physical etching process.

It will be assumed that ions travel as a beam in a fixed direction parallel to each other. The rate V at which the substrate is etched varies, depending on the angle of incidence θ of the ions as shown in FIG. 4B and hence is written as:

$$V = V(\theta). \quad \text{Formula (1)}$$

The x-y plane is defined to be parallel to the substrate surface and the z-axis perpendicular thereto as shown in FIG. 4A, and the ions are assumed to travel in the negative direction of the z-axis. Let $$z = f(x, y, t) \quad \text{Formula (2)}$$

represent the shape of the surface of the substrate at time t. The etch rate of the substrate surface in the z-direction is obtained by partial differentiation as follows:

$$\partial f/\partial t = -V(\theta) \quad \text{Formula (3)}$$

The angle of incidence θ is the angle between the z-axis and the normal to the substrate surface and is given as follows:

$$\tan \theta = \{(\partial z/\partial x)^2 + (\partial z/\partial y)^2\}^{1/2}. \quad \text{Formula (4)}$$

Assuming that V(θ) is given as follows:

$$V(\theta) = \{A + (B/\cos \theta)\} V_0 \quad \text{Formula (5)}$$

where $A + B = 1$ and $V_0 = V(0)$, one obtains $$\partial f/\partial t + (BV_0/\cos V) + AV_0 = 0. \quad \text{Formula (6)}$$

We now set $$f(x, y, t) = g(x, y, t) - AV_0 t. \quad \text{Formula (7)}$$

Since the second term on the right-hand side of Formula (7) becomes a constant if t is fixed, the difference between f(x, y, t) and g(x, y, t) becomes a constant. This means that $z = g(x, y, t)$ represents a curved surface translated from the surface $z = f(x, y, t)$ parallel to the z-axis. Next, one obtains by substituting Formula (7) into Formula (6)

$$\partial g/\partial t + (BV_0/\cos \theta) = 0. \quad \text{Formula (8)}$$

When $V_{gn}$ is defined as the etch rate at the point (x, y) on the surface of $z = g(x, y, t)$ in the normal direction, one obtains $$V_{gn} = (\partial g/\partial t) \cos \theta \quad \text{Formula (9)}$$

from a geometrical relationship. One then obtains $$V_{gn} = -BV_0 \quad \text{Formula (10)}$$

by substituting Formula (8) into Formula (9). This shows that $V_{gn}$ is a constant because B and $V_0$ are constants.

Next, the equation $z=g(x, y, t)$ is solved for t in order to obtain the properties of the surface represented thereby. If the solution is given as $$G(x,y,z)=t,\qquad\text{Formula (11)}$$

Formula (11) represents the shape of the curve $z(x, y, t)$ at time $t=t$. One then obtains from Formula (11)

$$\partial z/\partial t=1/(\partial G/\partial z),\ \partial z/\partial x=-(\partial G/\partial x)/(\partial G/\partial z),\ \text{and}$$
$$\partial z/\partial y=-(\partial G/\partial y)/(\partial G/\partial z).\qquad\text{Formulas (12)}$$

Since $g=z$, g is replaced by z in Formula (8), and since $(1/\cos^2\theta)=1+\tan^2\theta$, one obtains $$(\partial z/\partial t)^2=(BV_0)^2\{1+1/\tan^2\theta\}.\qquad\text{Formula (13)}$$

From Formulas (4), (12) and (13), one obtains the following eikonal equation, representing wave surface:

$$(\partial G/\partial x)^2+(\partial G/\partial y)^2+(\partial G/\partial z)^2=1/(BV_0)^2.\qquad\text{Formula (14)}$$

If $G(x, y, z)$ is a hemi-spherical, hemi-cylindrical or planar surface, $$G(x,y,z)=k^2(x^2+y^2+z^2),\qquad\text{Formula (15)}$$

$$G(x,y,z)=k^2(x^2+z^2),\ k^2(y^2+z^2)\ \text{or}\ k^2(x^2+y^2)\qquad\text{Formula (16)}$$

or $$G(x,y,z)=ax+by+cz,\qquad\text{Formula (17)}$$

respectively, where k, a, b and c are constants. Each of Formulas (15)-(17) can be made to satisfy Formula (14) by appropriately selecting these constants. As can be understood from the movement and the expansion of the wave surface, there is no curve other than those represented by Formulas (15)-(17) that can satisfy Formula (14). This shows that if $V(\theta)$ is given by Formula (5), the substrate surface comes to take on a shape comprising only spherical, cylindrical and planar surfaces as the etch depth increase, no matter what the initial shape was.

Dependence of the rate V of ion etching on the angle of ion incidence $\theta$ was measured on single crystal silicon. As silicon, a (100) silicon wafer ((100)Si) with mirror-polished (100) surface was used. For the ion etching, an ion shower system with a Kaufman-type ion source was used with argon as ionization gas. The conditions for the bombardment were: accelerating voltage=2 kV, ion current density=13 mA/cm$^2$ and the pressure inside the ion bombardment chamber=5× 10$^{-3}$ Pa. A portion of the (100) silicon wafer was masked by a Si wafer of an appropriate size for an exposure to ions and both exposed and unexposed parts were formed on the surface of the (100) Si wafer. Their step difference was measured by an instrument for measuring surface roughness to obtain the quantity of ion etching (etch depth). The etch rate was then obtained by dividing it by the etching time. This measurement of the etching time was repeated while varying the slope of the (100)Si wafer with respect to the direction of incidence of the ions. Ions were irradiated for 2 hours for each angle of the slope. The etch rate was about 6 μm/h at the angle of incidence of 0°. The results of this experiment are shown in FIG. 5B. The coefficients of Formula (5) were obtained as follows by the method of least squares from the data at points of $\theta=0°$, 10° and 20°:

$$V_0=5.89\ \mu\text{m/h},\ A=-3.70\ \text{and}\ B=4.70.\qquad\text{Formulas (18)}$$

The etch rate $V(\theta)$ obtained by substituting these values is written as $V_s(\theta)$ and is shown in FIG. 5B, superposed with experimental values. $V_s(\theta)$ nearly agrees with the experimental values until $\theta$ exceeds 40°. $V_{gn}$ of Formula (9) cannot be measured directly. One obtains $$V_{gn}=\{-V(\theta)+AV_0\}\cos\theta\qquad\text{Formula (19)}$$

by using Formula (7) and representing g of Formula (9) with f and further by using the relationship of Formula (3).

If the values of Formulas (18) are substituted into Formula (19) and the experimental values corresponding to each values of $\theta$ are substituted, the relationship between $\theta$ and $V_{gn}$ based on experimental values can be obtained. The relationship thus obtained is shown in FIG. 5C. The absolute value $BV_0$ of $V_{gn}$ (a fixed value independent of $\theta$) obtained by substituting the values of Formulas (18) into Formula (10) is also shown. The value of $V_{gn}$ obtained from Formula (19) agrees with $BV_0$ for the values of $\theta$ from 0° up to a certain value and is a constant. This upper limit $\theta_{max}$ is greater than 40°. If $\theta$ becomes greater than $\theta_{max}$, $V_{gn}$ by Formula (19) becomes smaller than $BV_0$, becoming smaller with $\theta$.

Thus, the experimentally measured values of $V(\theta)$ can be expressed in the form of Formula (5) for $\theta$ from 0° up to $\theta_{max}$. Thus, when a silicon substrate with unevenness on its surface is subjected to ion etching, as the etching process has progressed sufficiently and the largest slope of the surface unevenness with respect to the direction of incidence of the ions becomes $\theta_{max}$, the surface shape at such a moment comprises only spherical, cylindrical and planar surfaces satisfying Formula (14). If the ion etching process is carried out by anticipating this and forming an appropriate initial shape on the surface of the silicon substrate, it is possible to form a shape comprising only spherical, cylindrical and planar surfaces under a condition where the maximum slope is $\theta_{max}$ or less.

The value of $\theta_{max}$ in this situation is a value obtained from experimental results shown in FIGS. 5B and 5C. Since it naturally includes experimental errors, the value of $\theta_{max}$ capable of forming spherical and cylindrical concave parts must be obtained experimentally. So, we obtained a maximum slope angle (maximum angle of ion incidence) on a spherical concave part from the experimental results of FIGS. 7A, 7B, 7C, 7D and 7E. From the initial shape of FIG. 7A until FIG. 7E where all quadrangular pyramid concave parts have changed into spherical concave parts, the maximum angle of slope was about 28°, that is $$\theta_{max}\approx 28°.\qquad\text{Formula (20)}$$

Within the range of $\theta$ between 0° and $\theta_{max}$ (about 28°), $V_{gn}$ becomes constant. $V_{gn}$ decreases for $\theta$ over $\theta_{max}$ (about 28°) as shown in FIG. 5C.

Although the etch rate in the experiment described above was about 6 μm/h and it is different from the speed of about 5 μm/h in the experiments shown in FIGS. 6-13, it is probably due to the difference in the resistivity of the silicon substrate.

Next, there will be considered the theoretical ground for the process of evolving a quadrangular pyramid concave part into a spherical concave part.

Each quadrangular pyramid concave part has four (111) surfaces because of the characteristic of crystal anisotropic etching and its four side surfaces join together at its vertex. The angle between each of these (111) side surfaces and the (100) surface is 54.7°. The angle between each ridge line between two adjacent (111) side surfaces and the (100) surface is 45°.

The ion etching system for this invention serves to make an accelerated ion beam to propagate in an approximately parallel condition and to irradiate the sample surface. On the top surface and the side surfaces of the quadrangular pyramid concave parts where $\theta$ is constant, the flat area becomes smaller and remains flat as it is etched. Prior to the ion etching, however, the vertex of each quadrangular pyramid concave part may be mathematically considered to be a spherical surface with radius of curvature 0. After the ion etching is started, when a cylindrically shaped surface is formed between mutually adjacent (111) surfaces of a quadrangular pyramid concave part, it becomes $-45°<\theta<45°$ at the vertex of the quadrangular pyramid concave part. According to Formula (20), $V_{gn}$ becomes smaller if $\theta$ becomes greater than $\theta_{max}$ (about 28°). Thus, with the surface shape converted to $z=g(x, y, t)$ according to Formula (7), the etch rate becomes slower in the normal direction in areas where $\theta$ becomes greater than about 28° and such areas are replaced by a shape such that $\theta$ is smaller than about 28° and the etch rate in the normal direction is fast. At the spherical concave parts are formed from the vertex of the quadrangular pyramid concave parts, $\theta$ is smaller than about 28° and, as the ion etching progresses, the initial shape comes to be replaced by a spherical concave part.

Next will be considered the theoretical ground for the process of machining a wedge-shaped concave part into a cylindrical concave part.

Each wedge-shaped concave part has four (111) surfaces and two of these surfaces that mutually face each other are wedge-shaped. In the wedge-shaped area, $-54.7°<\theta<54.7°$. On the flat surface areas, the ion etching proceeds while the surface shape is maintained. The portion corresponding to the ridge of the wedge-shape is mathematically a cylindrical surface with radius of curvature 0, and a cylindrical concave part starts growing from there. At this time, as in the case of formation of a spherical concave part, the maximum angle of slope of the cylindrical concave part (the maximum angle of ion incidence) is about 28°. With the surface shape converted to $z=g(x, y, t)$ according to Formula (7), the etch rate becomes slower in the normal direction in areas where $\theta$ becomes greater than about 28° and such areas are replaced by a shape such that $\theta$ is smaller than about 28° and the etch rate in the normal direction is fast. As a result, the wedge-shaped concave part becomes replaced by a cylindrical concave part by the ion etching. Both end parts of the wedge-shaped concave part become semispherical.

A silicon substrate with molding concave parts for microlens according to this invention can be used as a mold directly, by depositing a protective film or by depositing a separating film for improving the separability from the molding material. Alternatively, it may also be used for producing molds with another material by using as masters the molding concave parts for microlens formed on this silicon substrate. Throughout herein, the term "mold" is used to mean not only those that are used as a mold but also masters that are used to produce other molds.

Molds for microlens according to this invention are hereinafter indicated by symbol M. Molds M of this invention have molding concave parts 3 for microlens with different shapes formed thereon as shown in FIGS. 14-16, and each of these molding concave parts 3 can be used not only directly as a mold but also for producing other molds as masters. Next, methods of producing a microlens array by using a mold M are explained.

The following are three representative methods of using a mold M as a mold.

Figure 18:
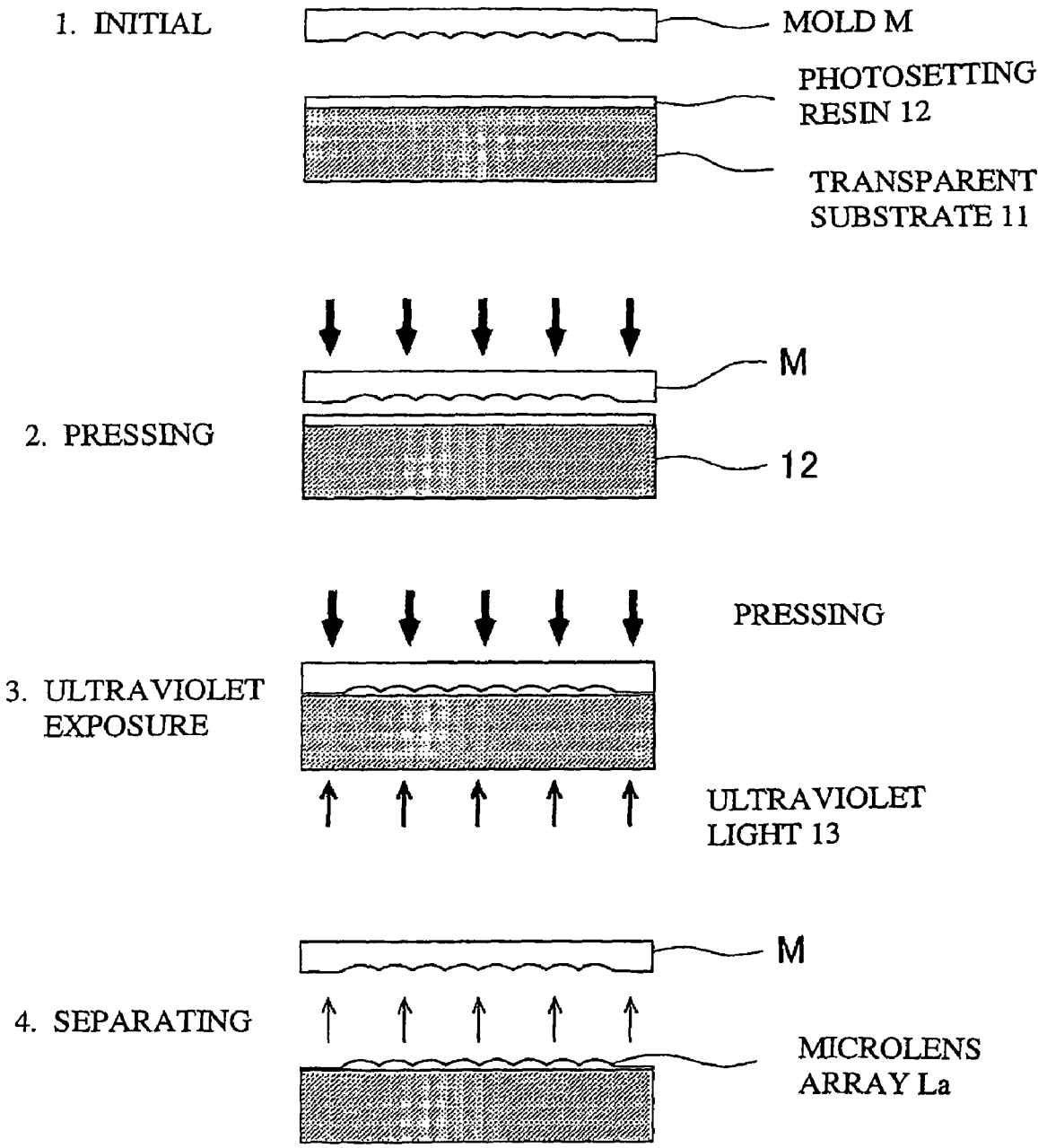
FIGS. 18-20 are diagrams for showing methods of producing a microlens array by using a mold of this invention.

(1-1) Shape Transfer to a Photosetting Resin (FIG. 18)

Photosetting resins have the property of becoming hard when exposed to ultraviolet light of wavelength in the range of 300-400 nm. Firstly, a substrate 11 is prepared by applying a photosetting resin 12 thereon. The substrate 11 is of a material that transmits ultraviolet light such as quartz glass and sapphire. A mold releasing agent such as silane coupling agent is applied to the surface of the mold M.

Secondly, the molding surface of the mold M is contacted to the surface of the photosetting resin 12 such that a pressure is applied between the mold M and the substrate 11. As a result, the photosetting resin 12 is maintained in the form of the mold.

Thirdly, ultraviolet light is made incident from the backside of the substrate 11 under the condition of the second step.

Fourthly, after the photosetting resin 12 has hardened, the mold M is separated. A substrate with a microlens array La is thus produced.

Figure 19:
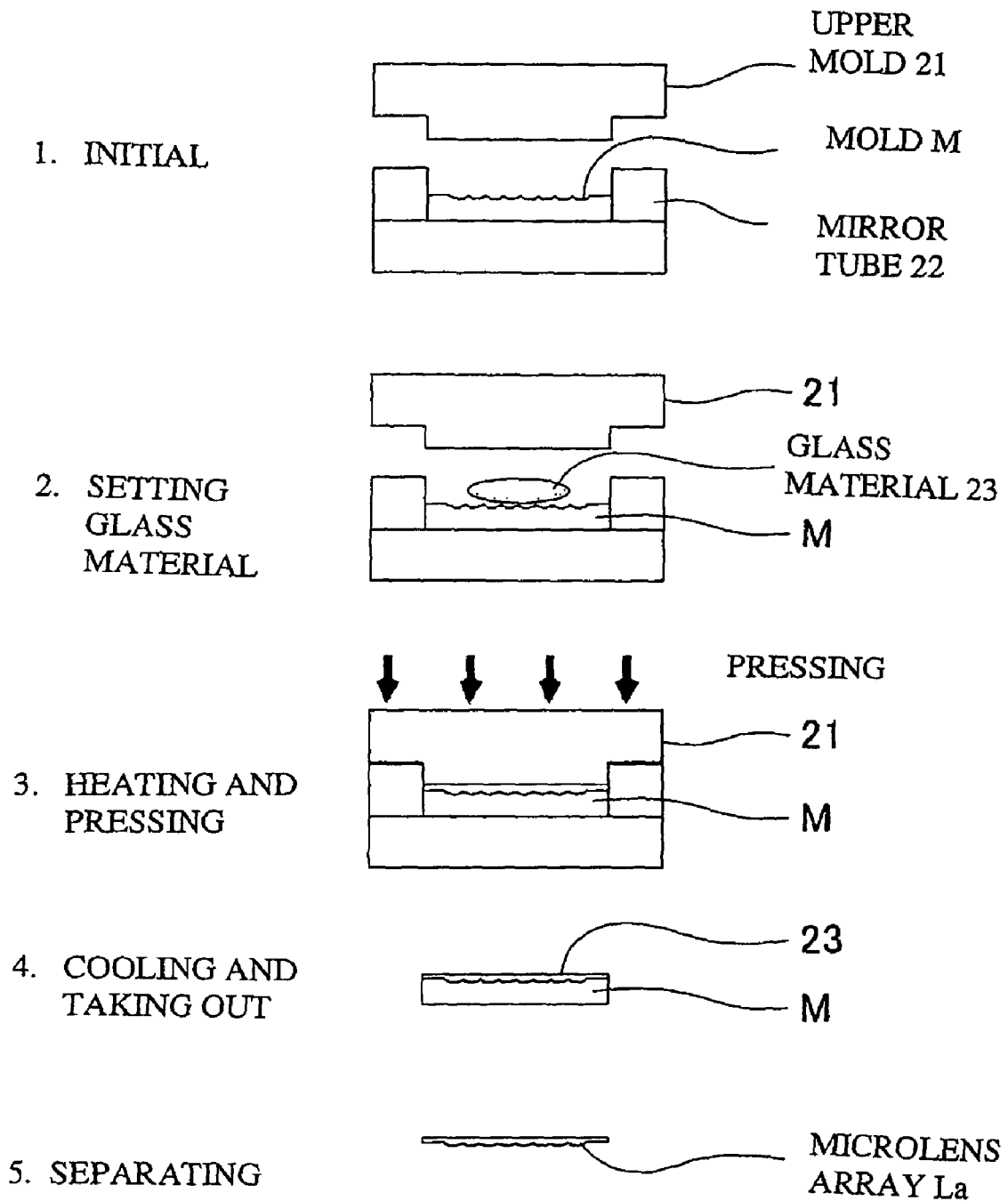

(1-2) Shape Transfer to Optical Glass (FIG. 19)

Molding glass that is being developed for press molding at a temperature in the range of 400° C.-600° C. is used as optical glass. This technology is currently being used for the production of common camera lenses. Since silicon has a high melting point of 1400° C. and is a mechanically stable material under 800° C., a glass microlens array can be produced by a mold M of this invention. An example is explained below where a conventional mold is used as the upper mold 21 and a mold M of this invention is used as the lower mold.

Firstly, the mold M as the lower mold is set to a column 22. Secondly, a glass material 23 is set on this lower mold. Thirdly, the upper mold 21, the lower mold and the column 22 are heated, and the upper mold 21 is pressed onto the lower mold. Fourthly, the mold M which has become integrated with the glass material 23 is taken out after they are cooled. Fifthly, the shape-transferred glass material 23 is separated from the mold M to obtain a microlens array La.

A Pt—Ir film or a DLC (diamond-like carbon) film may be used in the fifth step above in order to make it easier to remove the glass material. It is also possible to dissolve the silicon of the mold M by using a KOH solution or the like to separate out the microlens array La alone. Since the cost of the mold M is low, this presents no economical problem.

An upper mold 21 with a flat surface was shown but a microlens array La with microlenses having convex surfaces on both sides can be produced by setting the mold M in this part.

Figure 20:
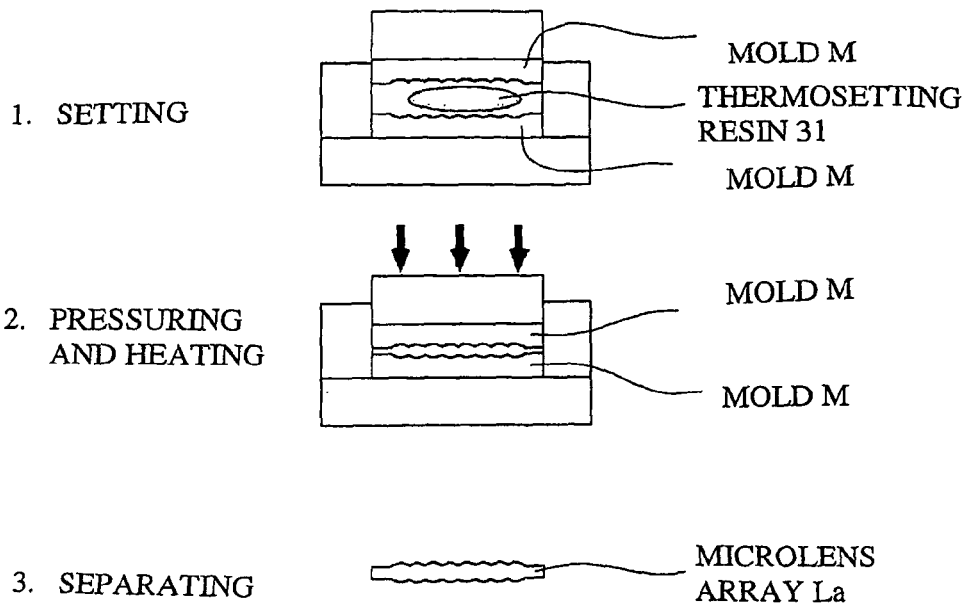

(1-3) Shape Transfer to a Thermosetting Resin (FIG. 20)

Thermosetting resins have the property of coming to be in a liquid-like condition if heated and becoming hardened if heated still further. Shape transfer to a thermosetting resin is carried out by means of a mold by using this property. An example of using two molds M with microlens arrays formed thereon will be described below.

Firstly, an appropriate amount of thermosetting resin 31 is placed inside molds M. Secondly, the molds M around their molding parts are heated while they are pressed together so as to compress the thermosetting resin 31, and the heating is continued under this condition until the resin 31 is hardened. Thirdly, when the molds M have attained an appropriate temperature after the heating is stopped, the molded resin 31 is moved to obtain a microlens array La made of this thermosetting resin 31. The microlens array La is formed on both surfaces.

Next, the following two representative examples are explained for using a mold M as a master.

Figure 21:
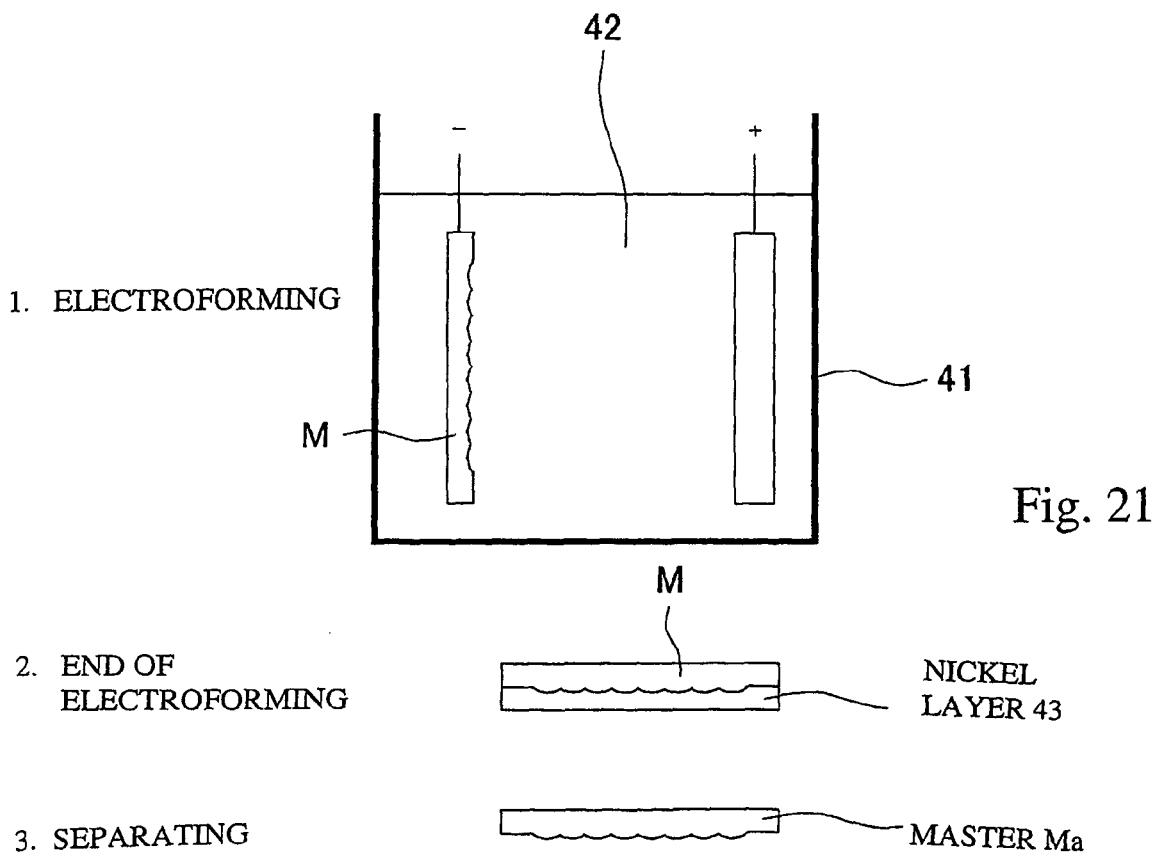
FIGS. 21 and 22 are diagrams for showing methods of producing a master mold by using a mold of this invention.

(2-1) Production of Master for Producing Concave Microlens Array (FIG. 21)

Firstly, a plating solution 42 with principal component such as nickel sulfamate is placed inside an electroforming tank 41 for depositing nickel of thickness of several hundred μm to several mm on the surface of a mold M having a microlens array formed thereon by using the mold M as the negative electrode. Secondly, the back surface of the nickel layer 43 is polished to become flat after the electroforming process. Thirdly, the silicon of the mold M is dissolved away by means of KOH solution or the like to obtain a master Ma made of nickel.

The method of producing a nickel master Ma by electroforming is a well known technology for the production of a mold for transferring shapes onto a polymer material or a polymer film.

Figure 22:
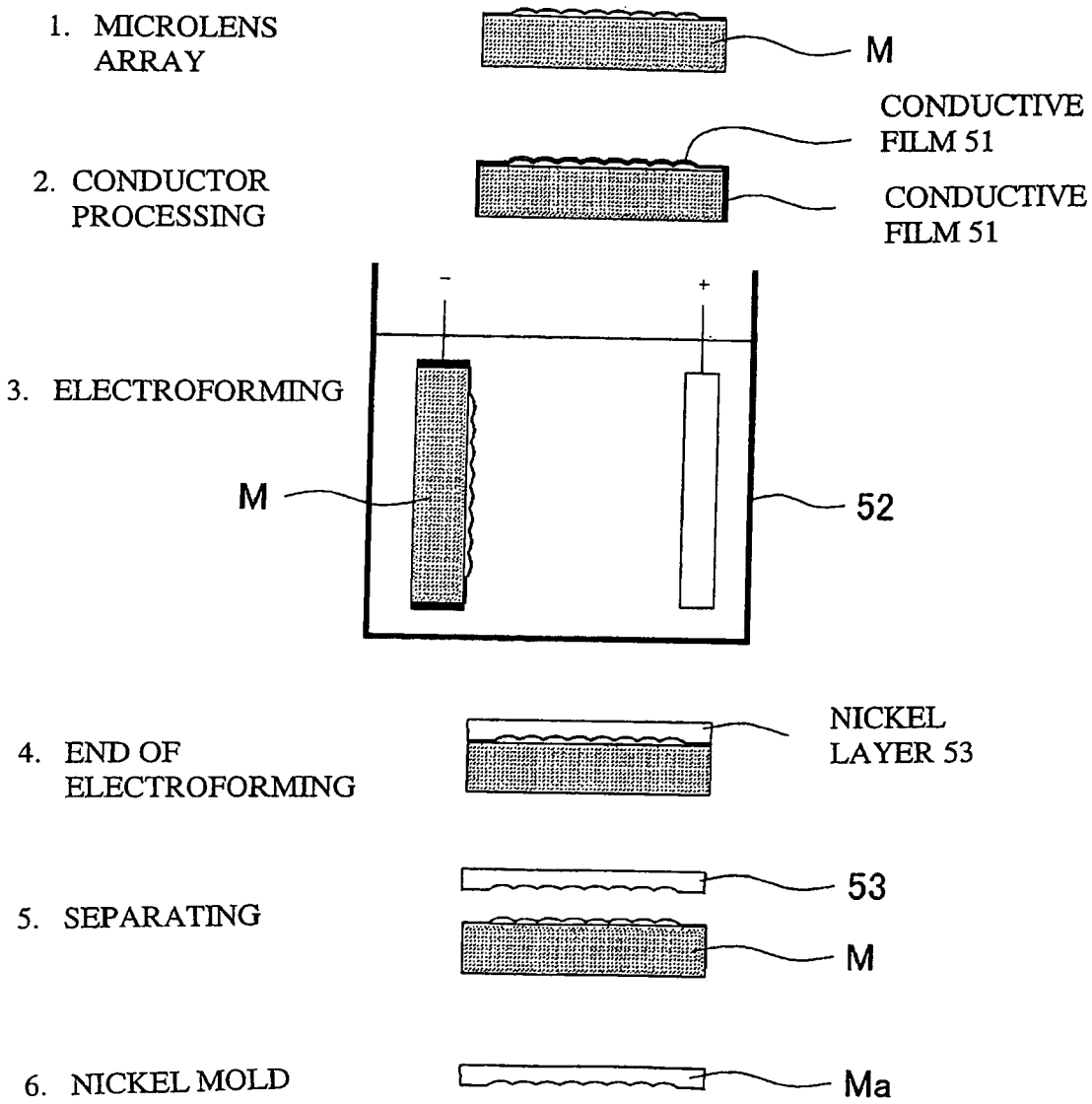
Figure 23A:
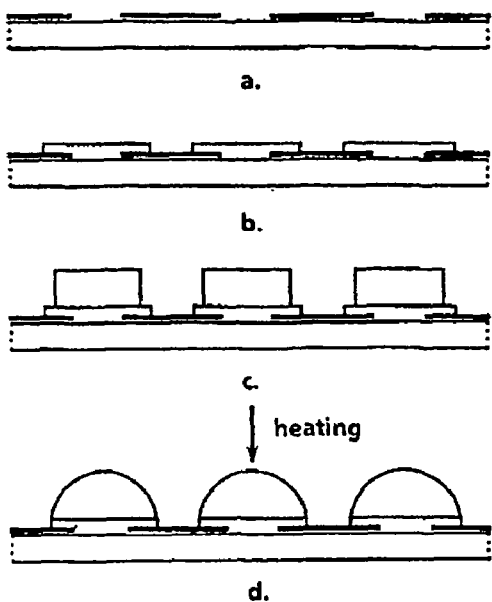
FIG. 23A shows a conventional reflow method.
Figure 23B:
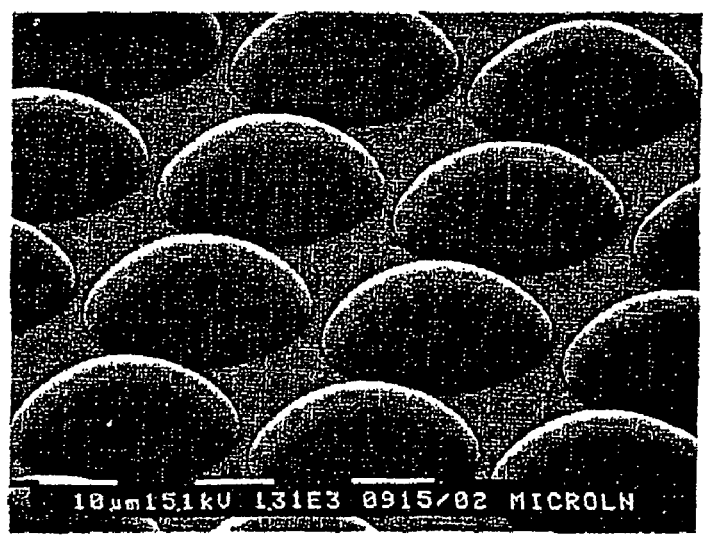
FIG. 23B is a diagonal view of a microlens array produced by a reflow method.

(2-2) Production of Master for Producing Convex Microlens Array (FIG. 22)

This is done by using a microlens array obtained by the method (1-1) described above. Firstly, a microlens array produced by a mold M is prepared. Secondly, an electroconductive film 51 is applied on the surface of the mold M and the side surfaces of the substrate. Nickel with thickness of several tens of nm is used as the electroconductive film. Thirdly, a plating solution 42 with nickel sulfamate or the like as its principal component is placed inside an electroforming tank 52 for depositing nickel of thickness of several hundred µm to several mm on the surface of the mold M having a microlens array formed thereon by using the mold M as the negative electrode. Fourthly, the back surface of the nickel layer 53 is polished to become flat after the electroforming process. Fifthly, the nickel layer 53 and the original microlens array are separated. This may be done by dissolving away the silicon of the mold M by means of KOH solution or the like and further dissolving away the photosetting resin by means of a solution for dissolving resins. Sixthly, a master Ma comprising nickel is obtained.

The nickel masters Ma produced by the methods (2-1) and (2-2) described above can be used as a thermal press mold for transferring shapes to a plastic film, a mold for injection molding for filling a molten plastic material at a high speed and a high pressure for transferring shapes and a mold for molding a thermosetting resin by placing a thermosetting resin in a nearly liquid condition and heating it to thereby harden it.

Merits of the masters for microlens produced by a method of this invention include the following.

Firstly, they are spherical to a very high degree. Since the molding concave parts 3 for microlens are highly spherical, microlenses of the refraction type having a nearly perfectly spherical shape can be produced with high reproducibility. By conventional production methods for microlenses of the refraction type, it was difficult to obtain microlenses of the refraction type having a nearly perfectly spherical shape with favorable reproducibility. Thus, microlenses of the diffraction type (Fresnel microlenses) had to be used whenever microlenses with optical characteristics such as focal lengths, numerical aperture (NA) and aberration sufficiently close to the desired design values are required. From the point of view of efficiency in light convergence and chromatic aberration, however, microlenses of the diffraction type are generally inferior to microlenses of the refraction type. By using a mold according to this invention, microlenses of the refraction type with superior optical characteristics can be obtained.

Secondly, the shape and measurements of a mold can be freely controlled. Since the radius of curvature, measurements and shape of a molding concave part for microlens are determined accurately by the amount of the substrate surface etched by ion etching, microlenses and microlens arrays can be produced exactly as designed by using such a molding concave part directly as a mold or a master.

Thirdly, it is possible to produce a microlens array without unwanted flat portions (non-lens portions) by using a mold without a flat part. There are optical instruments such as microlens arrays for three-dimensional views and microlens arrays for an optical switch for which the existence of flat portions (non-lens portions) is unnecessary or undesirable because they tend to bring about stray light. The characteristics of such optical instruments can be improved if a lens array without flat portions (non-lens portions) produced by using a mold of this invention is used for such an instrument.

Fourthly, there is no limitation on measurements. According to this invention, microlens arrays of various measurements from very small to relatively large can be produced because the molding concave parts for microlenses to be formed on the surface of the mold themselves can have a depth in the range of about 0.1 µm to several hundred µm.

Fifthly, even large areas are possible. Silicon substrates are used for the production of semiconductor integrated circuits. Those with diameter about 300 mm are also being manufactured and apparatus for processing such large silicon substrates are also being developed. As an ion etching system usable for the purpose of the present invention, systems having an ion source with diameter of 380 mm are commercially available. Microlenses and microlens arrays with large diameters can be produced by combining these devices.

Sixthly, the production cost is low. A large quantity of silicon substrates are being produced as a material for a mold or a master for the purpose of the production of semiconductor integrated circuits. Thus, the production cost is sufficiently low even if these silicon substrates are directly used as molds.

Material characteristics of the silicon used as the material for the molds of this invention are shown (with comparisons) in Table 1 below.

TABLE 1

|  | Single crystal Si | $Al_2O_3$ | SUS |
|---|---|---|---|
| Hardness (kg/mm2) | 850-1100 | 2100 | 660 |
| Young's modulus (GPa) | 190 (111) | 630 | 210 |
| Coefficient of linear extension ($10^{-6}$/° C.) | 2.36 | 5.4-8.7 | 17 |
| Melting point (° C.) | 1400 | 2570 | 1540 |

Hardness is greater than that for stainless steel and the melting point is about the same as that of stainless steel. There is no plastic deformation and no creeps are shown below 800° C. The material is resistive against high temperatures.

After such a silicon substrate as described above is processed by a method of this invention, its shape was measured by an instrument for measuring surface roughness and its external view was taken through an optical microscope of the differential interference type. The surface subjected to the ion etching was smooth and a circle could be drawn matching its sectional shape.

According to the production method of this invention, furthermore, shapes are formed from a point in the case of a spherical surface and from a line in the case of a cylindrical surface. From this and also from the results of theoretical analysis of the process of formation of spherical and cylindrical surfaces, it may be concluded that spherical and cylindrical surfaces are actually obtained. Thus, the sectional shape of the spherical or cylindrical surface formed on the silicon surface as a mold according to a production method of this invention is a circle, on any plane in the case of a sphere and on a plane perpendicular to the central axis in the case of a cylinder, with the accuracy of within $\lambda/5$ where $\lambda$ is the wavelength of the light and is about 0.55 µm. This is why a highly accurate spherical shape is obtained.

Thus, in the case of microlenses produced with a mold of this invention, spherical and cylindrical surfaces can be produced with an equally high accuracy as for ordinary lenses. Since the radius of curvature and the diameter are controllable, microlenses satisfying the design specification can be produced. In other words, if conditions such as the coefficient of refraction of the lens material, focal length and diameter are given, the radius of curvature becomes fixed from the coefficient of refraction and focal length. The thickness of the spherical or cylindrical surface is obtained from this radius of curvature and the diameter and an initial shape with the same depth can be formed on the silicon substrate. The ion etching process may be carried out thereafter by controlling the etch depth such that the radius of curvature comes to have a specified value.

Optical devices with lens functions used for a camera, a telescope, an optical microscope, an ultraviolet stepper, etc. are designed and produced in almost all cases with a lens of the refraction type. Especially in the case of an optical microscope and an ultraviolet stepper requiring a low level of aberration, only lenses comprising spherical surfaces are used. Microlenses of the refraction type having spherical surfaces on the same level as these lenses of the refraction type used in such an ordinary optical system are greatly useful for significantly improving the characteristics of optical communication devices, image-related devices and regression reflector devices.

What is claimed is:

1. A method of producing a mold for microlens, said method comprising sequentially carrying out:
    an etching step of forming quadrangular pyramid concave parts on a single crystal silicon substrate by anisotropic etching; and
    an ion etching step of forming a molding concave part from said quadrangular pyramid concave part by ion etching.
2. The method of claim 1 wherein said etching step comprises carrying out chemical anisotropic etching on a single crystal silicon substrate with a surface which is a {100} crystal surface.
3. The method of claim 1 wherein said ion etching step comprises carrying out an etching process on said single crystal silicon substrate by using an inactive gas as ionization gas and exposing said silicon substrate to accelerated ions.
4. The method of claim 1 wherein said quadrangular pyramid concave part is a square pyramid concave part and said molding concave part forms a spherical microlens.
5. The method of claim 1 wherein said quadrangular pyramid concave part is a rectangular pyramid concave part and said molding concave part forms a cylindrical microlens.

* * * * *